United States Patent
Martin et al.

(10) Patent No.: US 10,825,059 B2
(45) Date of Patent: Nov. 3, 2020

(54) FACILITATING HIGHLY TARGETED ADVERTISING TO IDENTIFIED AUDIENCE MEMBERS ACROSS SOCIAL MEDIA CHANNELS

(71) Applicant: Data Genomix LLC, Cleveland, OH (US)

(72) Inventors: Nick Martin, Cleveland, OH (US); Martin Mangan, Parma, OH (US); Aubrey Falconer, Careywood, ID (US)

(73) Assignee: Data Genomix LLC, Cleveland, OH (US)

( * ) Notice: Subject to any disclaimer, the term of this patent is extended or adjusted under 35 U.S.C. 154(b) by 38 days.

(21) Appl. No.: 16/136,906

(22) Filed: Sep. 20, 2018

(65) Prior Publication Data

US 2019/0087865 A1    Mar. 21, 2019

Related U.S. Application Data

(60) Provisional application No. 62/561,174, filed on Sep. 20, 2017.

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0269* (2013.01); *G06Q 50/01* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2008/0189169 A1* | 8/2008 | Turpin | G06Q 30/0264 705/7.33 |
| 2009/0204482 A1* | 8/2009 | Reshef | G06Q 30/02 705/319 |
| 2010/0268830 A1* | 10/2010 | McKee | G06Q 10/10 709/228 |

(Continued)

OTHER PUBLICATIONS

STIC EIC 3600 Search Report for U.S. Appl. No. 16/136,906 dated Mar. 30, 2020 (Year: 2020).*

*Primary Examiner* — Matthew T Sittner
(74) *Attorney, Agent, or Firm* — Calfee Halter & Griswold LLP

(57) ABSTRACT

The disclosed subject matter is directed to systems, computer-implemented methods, apparatus and/or computer program products that facilitate highly targeted advertising to identified audience members across social media channels. In one embodiment, a method is provided that comprises extracting, by a system comprising a processor, target audience information from one or more non-social media data sources based on one or more target audience criteria, the target audience information identifying individuals included in the target audience group. The method further comprises matching, by the system, the individuals with their respective social media profiles at the one or more social media systems based on the target audience information, and facilitating, by the system, directing the targeted advertisements to the individuals via their respective social media profiles.

20 Claims, 17 Drawing Sheets

(56) References Cited

U.S. PATENT DOCUMENTS

| | | | | |
|---|---|---|---|---|
| 2010/0280904 A1* | 11/2010 | Ahuja | ............... | H04L 12/185 |
| | | | | 705/14.58 |
| 2012/0221404 A1* | 8/2012 | Ahmed | ............. | G06Q 30/0261 |
| | | | | 705/14.39 |
| 2014/0040016 A1* | 2/2014 | Amla | ............... | G06Q 30/0267 |
| | | | | 705/14.45 |
| 2014/0164137 A1* | 6/2014 | Mathur | ............. | G06Q 30/0275 |
| | | | | 705/14.66 |
| 2014/0188616 A1* | 7/2014 | Badenhop | ......... | G06Q 30/0267 |
| | | | | 705/14.58 |
| 2015/0127565 A1* | 5/2015 | Chevalier | ............ | G06Q 30/00 |
| | | | | 705/319 |
| 2015/0161200 A1* | 6/2015 | Barba | ................... | G06Q 50/16 |
| | | | | 705/313 |
| 2016/0055539 A1* | 2/2016 | Margulis | ........... | G06Q 30/0205 |
| | | | | 705/7.34 |
| 2017/0262445 A1* | 9/2017 | Jeon | ..................... | G06F 16/337 |
| 2019/0087865 A1* | 3/2019 | Loree | ................... | G06Q 50/01 |

* cited by examiner

US 10,825,059 B2

FACILITATING HIGHLY TARGETED ADVERTISING TO IDENTIFIED AUDIENCE MEMBERS ACROSS SOCIAL MEDIA CHANNELS

CROSS-REFERENCE TO RELATED APPLICATIONS

This application claims priority to U.S. Provisional Patent Application Ser. No. 62/561,174 filed on Sep. 20, 2017, entitled "FACILITATING HIGHLY TARGETED ADVERTISING TO IDENTIFIED AUDIENCE MEMBERS ACROSS SOCIAL MEDIA CHANNELS." The entirety of the aforementioned application is incorporated by reference herein.

TECHNICAL FIELD

The present disclosure is directed to targeted advertising, and more particularly to systems, computer-implemented methods, apparatus and/or computer program products that facilitate highly targeted advertising to identified audience members across social media channels.

BRIEF DESCRIPTION OF THE DRAWINGS

Numerous aspects, embodiments, objects and advantages of the disclosed subject matter will be apparent upon consideration of the following detailed description, taken in conjunction with the accompanying drawings, in which like reference characters refer to like parts throughout, and in which.

DETAILED DESCRIPTION

Figure 1:
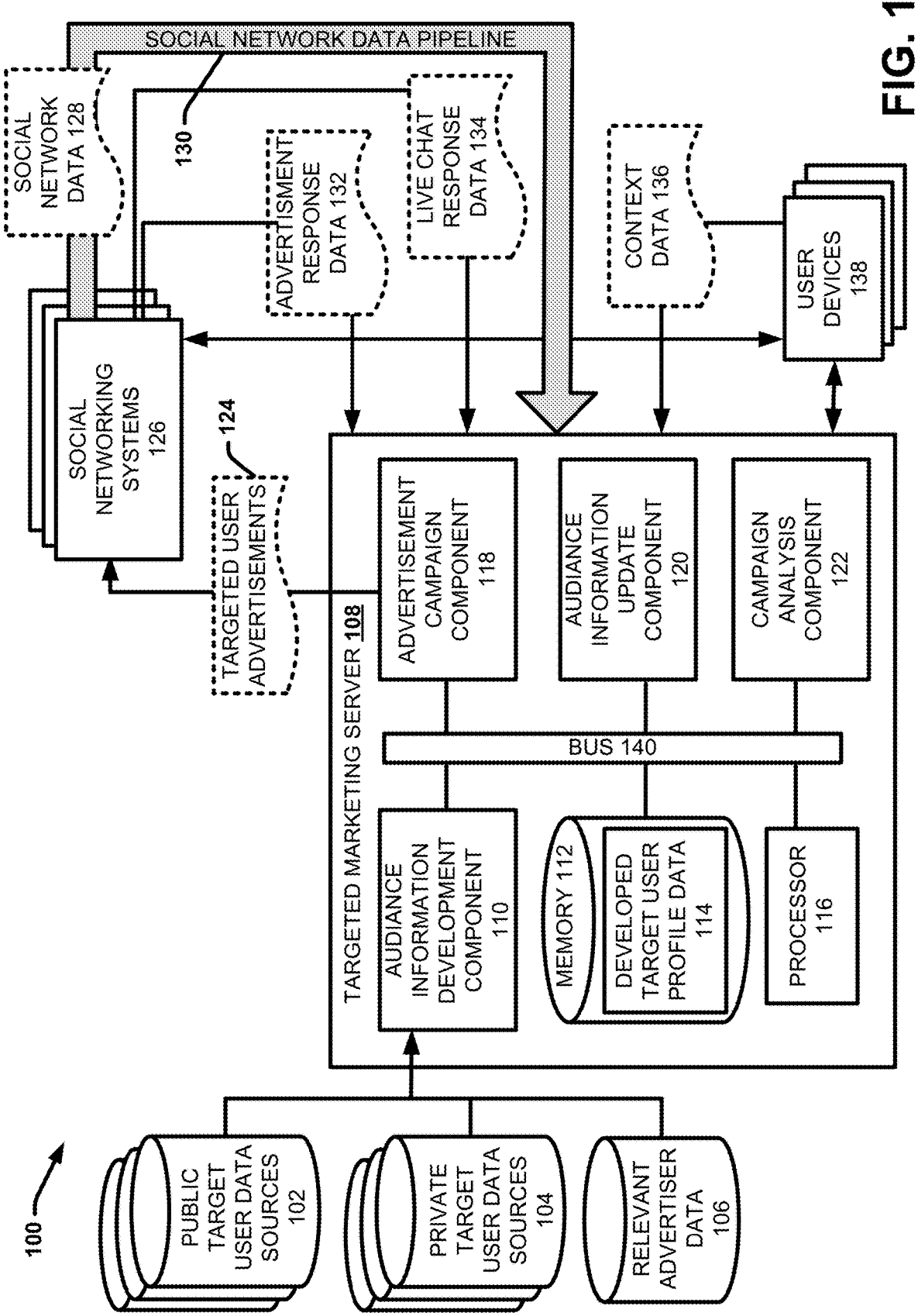
FIG. 1 illustrates an example system that facilitates highly targeted advertising to identified audience members across social media channels. in accordance with various aspects and embodiments described herein.

The following detailed description is merely illustrative and is not intended to limit embodiments and/or application or uses of embodiments. By way of introduction, the subject matter described in this disclosure provides systems, computer-implemented methods, apparatus and/or computer program products that facilitate highly targeted advertising to identified audience members across social media channels. The disclosed techniques employ sophisticated social ad technology, probabilistic algorithmic matching, and big data to ensure that advertisers communicate with exactly the people that matter. For example, rather than performing an advertisement campaign to target a potential group of people on social media that may have an interest in the contents of an advertisement based on association with a general group (e.g., woman between the ages of 18-30), the disclosed techniques can provide for launching an advertisement campaign to a much more specific group of people (e.g., woman between the ages of 18-30 that are registered republican voters, living in a specific congressional district that have not yet attended a local rally for a particular political candidate). As a result, entities that employ the disclosed targeted advertisement techniques can significantly reduce costs associated with fruitless social media advertising, increase user engagement, and increase conversion rates. In this regard, the disclosed techniques provide tools that allow advertisers to reach targeted people in a more meaningful and efficient way (i.e., better, faster, cheaper) than they can through the existing platforms and/or on their own.

In various embodiments, the disclosed techniques provide for highly targeted and efficient social network advertising by leveraging off of disparate and non-social network based data sources. In particular, these data sources can be parsed to identify and extract target audience information identifying target audience members and defining specific attributes about the respective target audience members. The disclosed techniques further intelligently cluster and format the target audience information to facilitate directly identifying the respective target audience members' social network/social media profiles at one or more social networking systems. Once their social network profiles are identified, the disclosed systems can deliver targeted advertisements to the respective audience members vie their respective social network profiles. Further, once target audience members are identified on social media, the disclosed techniques can establish a pipeline directly to their social content. Their social network profiles can then be scrubbed to develop richer information about all potential targets. For example, their reactions to targeted advertisements on social media as well as static and dynamic social activity data (e.g., regarding new posts, share, likes, etc.) can also feedback into the disclosed system to influence future targeting.

The disclosed targeted advertising techniques can be employed across a variety of different verticals. For example, in various example implementations, the disclosed targeted advertisement techniques are described in association with recruiting candidates for hiring in a specific industry (e.g., healthcare, transportation, legal, etc.). Other example implementations are described in association with employing the disclosed techniques to identify and target individuals in association with supporting a particular political campaign. Still other example implementations are described in association with targeting individuals with advertisements directed to purchasing a product or service. However, it should be appreciated that the disclosed techniques can be employed by any potential entity that has an interest in reaching specific individuals, whether it be with the intent of achieving a sale, a vote, a recommendation, a friend, a follower, a hiring, delivering an informative message, or the like.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

Referring now to the drawings, with reference initially to FIG. 1, presented is diagram of an example system 100 that facilitates highly targeted advertising to identified audience members across social media channels in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a targeted marketing server 108 that can provide the disclosed targeted marketing services to various entities. An entity that employs system 100 to provided targeted advertisements to individuals is referred to herein as "the advertiser." It should be appreciated that the advertiser can include an individual, an organization, another computing system, or the like. System 100 further includes various data sources, including one or more public target user data sources 102, one or more private user data sources 104 and relevant advertiser data 106. System 100 also includes one or more social networking systems 126 and one or more user devices 138. The social networking systems 126 can include for example, various established or future network accessible social networking systems, including but not limited to: Facebook™, Twitter™, Instagram™, Snapchat™, Pinterest™, Google+™, LinkedIn™, and the like. Generally, the targeted marketing server 108, the one or more social networking systems 126, and the one or more user devices 138 can include or be communicatively coupled to memory that stores computer executable components and a processor that executes the computer executable components stored in the memory, examples of which can be found with reference to FIG. 14. For example, in the embodiment shown, the targeted marketing server 108 can include or be communicatively coupled to at least one memory 112 that stores computer executable components. These computer executable components can include for example, an audience information development component 110, an advertisement campaign component 118, an audience information update component 120, and a campaign analysis component 122. The targeted marking server 108 can include processor 116 to execute these computer executable components. The targeted marketing server 108 can further include a system bus 140 to communicative couple the various components of the targeted marketing server 108 (e.g., the audience information development component 110, the advertisement campaign component 118, the audience information update component 120, the campaign analysis component 122, the memory 112 and the processor 116).

The targeted marketing server 108 and the various data sources, devices, systems, and/or components of system 100 can be provided at one or more dedicated computing devices (e.g., real or virtual machines). Users can interface with the targeted marketing server 108 and/or the one or more social networking systems 126 using their respective user devices 138. As used in this disclosure, the terms "user," "individual", "audience member", "advertiser" and the like, refer to a person, entity, system, or combination thereof that can employ system 100 (or additional systems described in this disclosure) using a client device 138. The client devices 138 can include any suitable computing device associated with a user and configured to interact with targeted marketing server 108 and/or the one or more social networking systems. For example, the client devices 138 can include a desktop computer, a laptop computer, a television, an Internet enabled television, a mobile phone, a smartphone, a tablet personal computer (PC), or a personal digital assistant PDA.

In one or more embodiments, the targeted marketing server 108 can provide various services to users via a suitable network accessible platform. For example, in some implementations, the targeted marketing server 108 can provide processed information and interactive targeted marketing tools to users via a website platform that can be accessed using a browser provided on their respective client devices 138. In another implementation, the targeted marketing server 108 can provide processed information and interactive targeted marketing tools to users via a mobile application, a thin client application, a thick client application, a hybrid application, a web-application and the like. Still in other implementations, one or more components of the targeted marketing server 108 can be provided at a client device 138 and accessed directly in an offline mode.

The various components and devices of system 100 can be connected either directly or via one or more networks, (not shown). Such network(s) can include wired and wireless networks, including but not limited to, a cellular network, a wide area network (WAD, e.g., the Internet), a local area network (LAN), or a personal area network (PAN). For example, a client device 138 can communicate with the targeted marketing server 108, and/or the one or more social networking systems 126 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks. It is to be appreciated that although various components of the targeted marketing server 108 are depicted as co-located on a same device, such implementation is not so limited. For example, one or more components of the targeted marketing server can be located at another device or associated system, a client device 138 another server, and/or the cloud.

In one or more embodiments, the targeted marketing server 108 can include audience information development component 110 to develop rich profile information for individuals that can be targets for specific advertisement campaigns. This rich profile information is identified in system 100 as developed user profile information 114 and stored in memory 112. In particular, the audience information development component can employ sophisticated machine learning techniques to identify, extract and combine information from a plurality of different data sources regarding a specific group of audience members that an advertiser is interested in targeting. In this regard, an entity desiring to launch an advertisement campaign (e.g., a company looking to launch a campaign to recruit employees, a company looking to direct buyers to their product website, etc.) can initially provide the targeted marketing server 108 with information describing or indicating attributes of a specific audience they would like to target. The attributes of the audience members can be defined broadly or down to a very granular level such that the advertiser can ensure that they are specifically spending advertisement revenue to reach the people that matter. In some embodiments, the audience information development component 110 can also access and employ relevant advertiser data 106 to facilitate identifying and retrieving information about the desired audience members the advertiser is interested in targeting. For example, the relevant advertiser data 106 can include information regarding existing or past customers, existing or past employees, information describing job requirements of a desired candidate for a recruiting campaign, and the like. Based on the relevant advertiser data 106 and/or information providing by the advertiser describing or indicating attributes of a specific group of audience members, (e.g., woman between the ages of 18-30 that are registered republican voters, living in a specific congressional district that have not yet attended a local rally for a particular political candidate), the audience information development component 110 can scan various data sources to identify actual individuals meeting the audience criteria. In the embodiment shown, these data sources are identified as public target user data sources 102, and private target user data sources 104. These data sources can include essentially any network accessible data source with information that is relevant to the defined audience group.

For example, the public target user data sources 102 can include public directories or databases with names, identification numbers, and other distinguishing information (e.g., information such as their date of birth, middle name, age, gender, physical address, email address, phone number, image data of the user, information regarding their employment history, information regarding their educational history (e.g., schools attended), information regarding their friends/family, etc.) for people associated with a particular audience, such as people that are included on a specific registration list (e.g., a list of registered voters, a list of registered attendees to a conferences, a list of licensed nurses), people that belong to a specific board or organization (e.g., the American Bar Association), people that work for a specific employer, people that participated in a particular event (e.g., a political rally, a concert, a sporting event, etc.). For instance, the public user data sources 102 can include Ohio voter registration information or Ohio nursing board information that identifies all licensed nurses in Ohio. In another example, the public user data sources 102 can include public websites, databases or the like with additional discoverable information (including text and media such as video and/or audio) about an identified person. The private data sources 104 can include restricted or proprietary data sources that the targeting marketing server 108 has been authorized to access. For example, such as private data sources can include a data sources associated with the entity for which the advertisement campaign is based and which the entity has provided the targeted marketing server 108 access to. In another example, the one or more private target user data sources 104 can include information curated by another system or entity that has granted the targeted marketing server 108 a license for use.

In one or more embodiments, the audience information development component 110 can be configured to scan the various data sources (e.g., the public target user data sources 102 and/or the private target user data sources 104) to identify individuals that may be included in the audience group. Using information identifying a particular individual found at one data source (e.g., a name, an email address, etc.), the audience information development component 110 can find additional relevant information about that individual at other data sources that can be used to facilitate determining whether that individual is actually included in the target audience group (e.g., licensed nurses in Ohio with more than 5 years experiences in emergency medicine) and/or to facilitate identifying that individual's profile at the one or more social networking systems. For example, in addition to identifying information such as the name of a person or an identifier for a person that is included in the defined audience group, the audience information development component 110 can specifically look for, identify and extract attributes that about the respective individuals that can be used to identify them on the one or more social networking platforms 126. For example, in addition to a person's name, the disclosed techniques can identify and extract information identifying their date of birth, middle name, age, gender, physical address, email address, phone number, image data of the user, information regarding their employment history, information regarding their educational history (e.g., schools attended), information regarding their friends/family, and the like.

The audience information development component 110 can further identify and extract additional information about an identified individual that may be useful to tailor advertisements to that user. For example, such additional information can include details about the user's offline activities, historical information about the user's professional career, preferences of the user and the like. In this regard, the audience information development component 110 can intelligently identify, extract and compile additional relevant information about target audience members from various data sources, that is not be included or discoverable (e.g., due to privacy settings), at the one or more existing social networking systems. In some implementations, in addition to employing this information to characterize the user as belonging to a target audience and/or to facilitate identifying the user at social networking systems, such additional information can further facilitate determining whether to target that individual with an advertisement, what advertisements to target that individual with, when to target the individual with a particular advertisement, what social media platform to focus on, and the like. Using the information extracted and collated for respective audience members from disparate data sources, the audience information development component 110 can develop a rich profile for each member and store this internal profile information in memory accessible to the targeted marketing server 108 (e.g., as developed target user profile data 114).

Using the profile information generated for respective audience members, the advertisement campaign component 118 can provide for interfacing with the one or more social networking systems 126 to identify the respective audience members' profiles at the one or more social networking systems 126 to deliver targeted user advertisements 124 to these individuals. In this regard, the advertisement campaign component 118 can provide targeted user advertisements 124 to social network members on a one-to-one ratio, wherein each advertisement is provided to a specifically identified person, not a general group of individuals that meeting some criteria. These specifically identified people will include only those matching the specific attributes desired for the target audience group. As discussed above and in greater detail infra, these attributes can be highly specific (e.g., nurses in the Cleveland area with over 10 years experience in emergency medicine) to ensure that advertisements are targeted to only a very select and relevant group of individuals, thereby minimizing time and money expended on fruitless advertising to indifferent or inappropriate targets. Further, the advertisement campaign component 118 can ensure that the probability a particular person received a targeted advertisement on their social network page is 100% or nearly 100%.

For example, some social networking systems allow third party advertisers to select certain criterion of members to which the advertiser would like to target advertisements. However, such criterion options are generally broad and limit targeting advertisements to an unknown group of people. For example, Facebook™ allows third party advertisers to filter members for targeting with advertisements based on a geographic region (e.g., north America) and/or a user preference or user interest (e.g., people that enjoy camping). However, the resulting target audience group is rather expansive and generally associated with an unpredictable or low probability of reaching actual users that matter. Further, these techniques fail to provide information identifying the actual members (e.g., names/profile names) of the members included in the target group. Some social networking systems also allow third party advertisers to provide a list of names or email addresses identifying a target audience group. The social networking system will then apply that list to their member database, and if a minimum threshold of matching members is identified, the social networking system will deliver target advertisements to those members who matched. However, with these implementations, the third party advertiser still has no way of knowing exactly which people on the list matched and thus exactly which people on the list were targeted with the desired advertisements. Further, some people on the third party advertiser's list may not match due to incompatible information provided by the third party advertiser used to identify a person and the information used by the social networking system used to identify the same person. Accordingly, many relevant members fall through the cracks.

The advertisement campaign component 118 however can generate a discrete list of target individuals with information identifying tailored attributes for those individuals that can ensure with a high probability that their corresponding social network profiles can be identified at the one or more social networking systems 126. Further the advertisement campaign component 118 can employ techniques for clustering target members into smaller groups corresponding to the minimum match threshold applied by some social networking systems to authorize proceeding with a requested advisement campaign. In this way, the advertisement campaign component 118 can ensure with a high probability (e.g., 100% or substantially 100%) which specific proposed candidates matched and were delivered advertisements.

The targeted user advertisements 124 can vary based on the interests of the advertiser. For example, the targeted advertisements 124 can include static banner advertisements, display advertisements, multimedia advertisements (e.g., video and/or audio) and the like. The targeted user advertisements 124 can be provided as in-feed advertisements, side-bar advertisements, pop-up advertisements and the like. In some embodiments, as discussed infra with reference to FIG. 4, the targeted advertisements 124 can include a tap-to-call functionality and/or a chat-bot functionality.

Once an individual is identified and targeted with an advertisement via the user's social network profile at a social network system of the one or more social networking systems 126, the targeted marketing server 108 further provide for extracting additional information about the individual from their social network profile. In particular, once a connection has been made between a target user and the user's social network profile (or profiles if the member is targeted at several different social network systems), the targeted marketing server 108 can establish a social network data pipeline 130 with the social network system that facilitates retrieving additional social network data 128 about the user. For example, the social network data 128 can include any potential accessible information (e.g., based on user privacy settings) about the target user, such as demographic information, posting information, sharing information, number of social contacts (e.g., friends, followers), identities of social contacts, image data, comments/feedback data, and the like that can be used and/or processed to determine characteristics about the user that can facilitate targeting future advertisements to that user. This social network data 128 can include static information included in the target user's social network profile at the time of initial advertisement exposure as well ongoing dynamic information associated with real-time social network activity of the target user. For example, the real-time social network data can include information regarding new posts, new image/video uploads, new comments, social activity (e.g., liking and disliking, providing a particular response emoji, sharing, etc.) and the like. The audience information update component 120 can be configured to employ this social network data 128 to update the locally generated profile information for the target user to further tailor delivery of future targeted advertisement content to the individual, either for the same advertiser or additional advertisers.

In addition to social network data 128, the targeted marketing server 108 can also receive advertisement response data 132, live chat response data 134 and context data 136. The advertisement response data 132 can include information regarding a target user's reaction to an advertisement. For example, if the advertisement includes a link to that can be selected to direct the user to a particular landing page, the advertisement response data 132 can include information indicating if and when the user selected the link. In another example, if the advertisement includes a video, the advertisement response data 132 can include information regarding whether the user watched the video and to what degree of completion, referred to as viewership retention. In implementations in which an advertisement includes a tap-to-call functionality and/or a chat-bot functionality, the advertisement response data 132 can also include information indicating whether the user activated either of these features. Further, in some implementations in which the target user employs the tap-to-call functionality or the chat-bot functionality, the targeted marketing server 108 can receive live chat response data. For example, with respect to the tap-to-call functionality, the live chat response data 134 can include live recorded dialogue between the target user and the calling service that provides tap-to-call functionality. With respect to the chat-bot functionality, this chat response data 134 can include the text dialogue between the target user and the chat bot. In some embodiments, the audience information update component 120 can employ pattern recognition techniques, natural language procession, and/or various machine learning techniques to further analyze the advertisement response data 132 and/or the live chat response data 134 to further learn additional information about the target user. For example, the audience information update component can learn additional information regarding the user's preferences, interests, mental state, intention, personality traits and the like. The audience information component 120 can further update the target user's profile data 114 to include such additional information.

In some embodiments, the advertisement campaign component 118 can also employ context data 136 regarding a target user's current context to facilitate providing targeted advertisements to the user at the user's social media profile that is relevant to the user's current context. In this regard, the context data 136 can include but is not limited to, information regarding a current location of the user, a current activity of the user, a current mobility state of the user, a current direction of travel, other users located near or with the target user, and the like. In the embodiment shown, this context data 136 can be received directly from the respective user device 138 employed by the users (e.g., in response to permission granted by the user to access such context information). In other implementations, the context data 136 can be derived from the social network data 128, the live chat response data 134, or access from one or more external systems/sources (e.g., the one or more public target user data sources 102, the one or more private target user data sources 104, of other sources). These additional embodiments are discussed infra with reference to FIG. 13.

The campaign analysis component 122 can be configured to evaluate the advertisement response data 132 and in some implementations, the live chat response data 134 with respect to various KPI to evaluate the performance of a particular advertisement campaign. For example, the campaign analysis component 122 can regularly perform analytics on advertisement response data 132 and/or the live chat response data 134 to determine information regarding whether and what users reacted positively/negatively to an advertisement to facilitate further tailoring who, when and where to target with additional advertisements. For example, the campaign analysis component 122 can determine information regarding, viewership/audience retention, conversion rates, as well as sentimental analysis on reactions and advertisement shares with respect to different types of audience characteristics, different social network systems, different social network platforms, (e.g., mobile platform vs. web-application platform, etc.) and the like. Using various machine-learning techniques the campaign analysis component 122 can further determine mechanisms to optimize the goals of the advertisement campaign. These mechanisms can then be implemented in the future by the advertisement campaign component 118.

Figure 2:
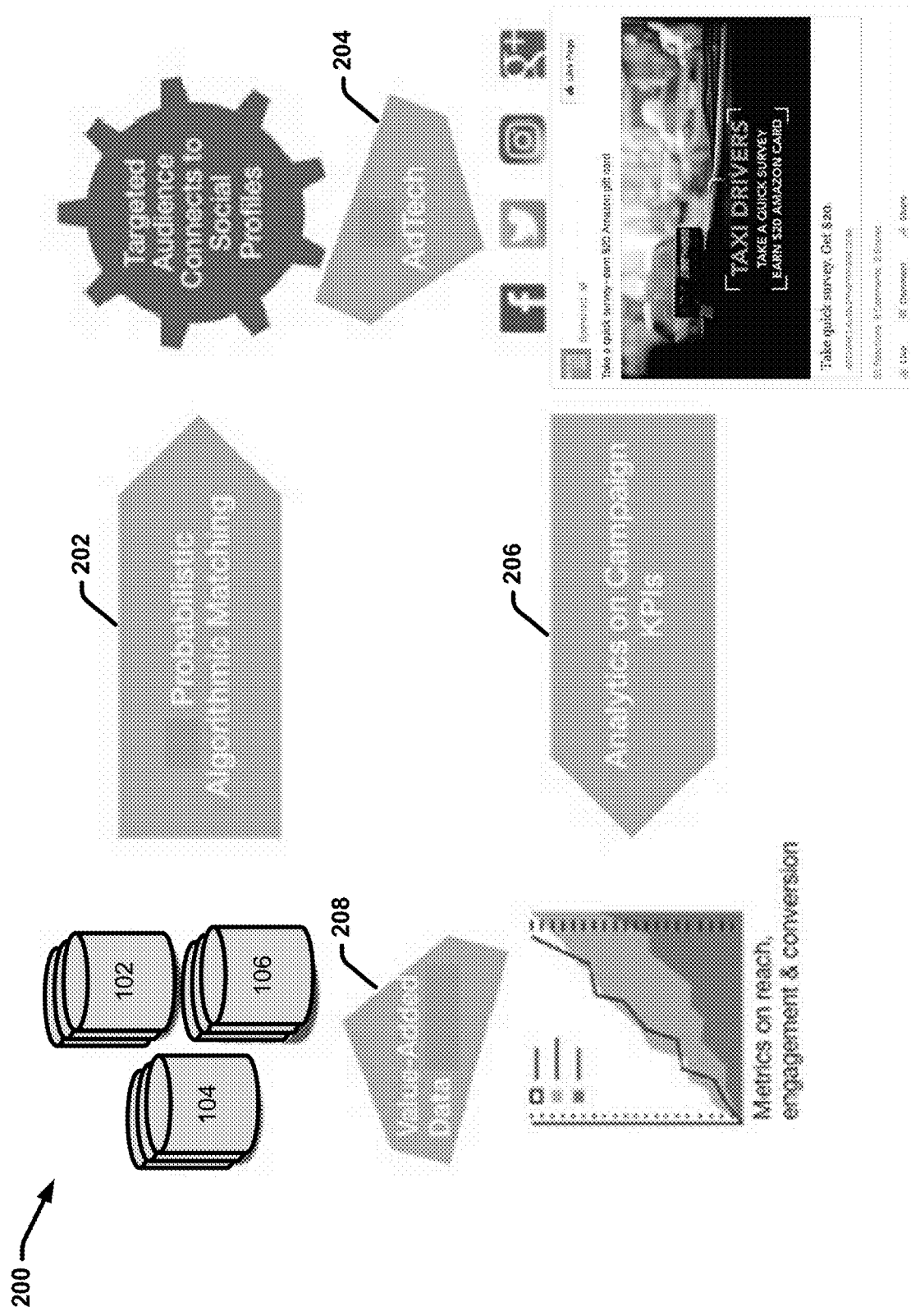
FIG. 2 provides a high level flow diagram of an example computer-implemented method that provides for highly targeted advertising to identified audience members across social media channels in accordance with various aspects and embodiments described herein.

FIG. 2 provides a high level flow diagram of an example computer-implemented method 200 that provides for highly targeted advertising to identified audience members across social media channels in accordance with various aspects and embodiments described herein. In one or more embodiments, the targeted marketing server 108 can perform method 200 using the audience information development component 110, the advertising campaign component 118, the audience information update component 120 and the campaign analysis component 122. Repetitive description of like elements employed in respective embodiments is omitted for sake of brevity.

With reference to FIGS. 1 and 2, at 202, using the audience information development component 110, the target marketing server 108 can perform probabilistic algorithmic matching to match target audience members identified based on information extracted from various disparate, non-social media sources (e.g., public target user data sources 102, private target user data sources 104, and relevant advertiser data 106) with their social network profiles using gathered attributes for target audience members at the disparate data sources. For example, in an implementation in which an alternative ride-sharing company (e.g., Uber™, Lyft™, etc.) employs system 100 to drive targeted advertisements to recruit new drivers, the alternative ride-sharing company can provide information to the targeted marketing server 108 identifying or indicating desired characteristics of optimal candidates. For instance, the alternative ride-sharing company can request candidates within a particular geographic area, that have clean background checks, own their own vehicles which are qualified ride share vehicles, and do not yet work for the ride-share company. In accordance with this example, the targeted marketing server 108 can determine that one strong target audience group can include taxi drivers that fit this criterion. Based on this defined target audience, the target marketing server 108 can access and extract information from one or more external data sources 102, 104 and/or 106, identifying and describing attributes of individual candidates that are desirable candidates. For example, the targeted marketing server 108 can employ information identifying all registered taxi drivers in the defined geographic area. Using this identification information, the targeted marketing server 108 can further examine other relevant data sources to specifically identify those taxi drivers that fit the additional driver requirements. For example, the target marketing server 108 can identify those taxi drivers with clean background checks, based on public criminal record information. The target marketing server 108 can also identify those qualified taxi drivers that own their own vehicles that are also qualified ride-share type vehicles (e.g., year, make, model, mileage, etc.), based on public vehicle registration information). The target marketing server 108 can also identify those which are known already employed by the ride-sharing service based on internal information provided by the ride-share company identifying all existing employees.

In association with identifying and extracting information regarding qualified candidates, the target marketing server 108 can further specifically retrieve information regarding known attributes for the identified candidates that can facilitate matching them to their social network profiles. In this regard, in addition to information such a first and last names for the qualified candidates, the target marketing server 108 can also collect (e.g., from disparate data sources), information including but not limited to: date of birth, age, gender, physical address, email address, phone number, image data of the user, information regarding their employment history, information regarding their educational history (e.g., schools attended), information regarding their friends/family, etc). The target marketing server 108 can further employ these attributes to facilitate accurately matching the identified candidates with the social network profiles.

At 204, the target marketing server 108 can then employ targeted advertisement technology to deliver (e.g., using the advertisement campaign component 118) targeted advertisements to the matched audience members at their social network profiles. For example, in the embodiment shown, en example advertisement is displayed that targets taxi drivers and encourages them to take a quick server to earn a $20 Amazon™ gift card. In accordance with the example above regarding recruiting new drivers for the alternative rideshare service, this advertisement can intelligently entice the targeted candidates to initially fill out the survey with the intention on receiving the gift card. However, the survey itself can provide various applications that can be used be helpful to the alternative ride sharing component in association with ultimately recruiting qualified candidates. For example, in one implementation, the survey can facilitate receiving additional information about potential candidates to further learn if they are appropriate candidates. The survey can also include questions that facilitate informing the taxi drivers about the alternative ride share service and in the end provide them a link and/or incentive to apply.

At 206, the target marketing server 108 can perform various KPI based analytics on the advertising campaign to evaluate the performance of the campaign (e.g., using the campaign analysis component 122). For example, the target marketing server 108 can develop metrics on reach, engagement, conversion and the like. At 208 the target marketing server 108 can further employ machine learning techniques to learn from the evaluated metrics to add value to internal data regarding the candidates and the advertisement campaign to facilitate improving performance in the future (e.g., using the audience information update component 120). For example, based on the KPIs, the target marketing server 108 can determine adjustments to the target audience criteria, adjustments the type of advertisements used, adjustments to the timing of advertisement distribution, adjustments to the social media platforms to which the advertisements are directed, etc., that improve overall performance of the target marketing server 108.

Figure 3:
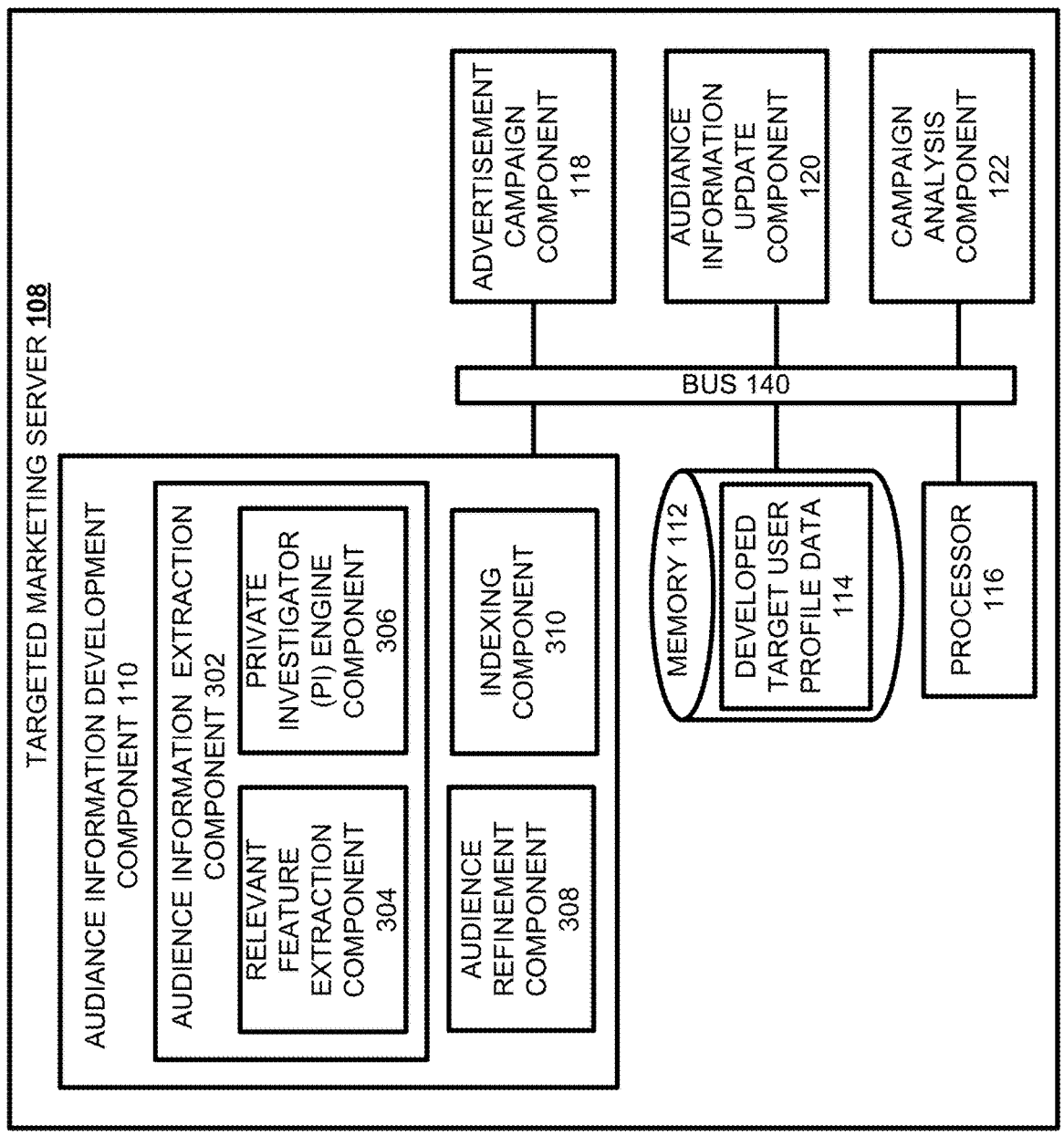
FIG. 3 provides example components of a targeted marketing server that facilitate developing information identifying highly targeted audience members for directing advertisement content to across social media channels in accordance with various aspects and embodiments described herein.

FIG. 3 provides example components of the audience information development component 110 of the targeted marketing server 108 that facilitate developing information identifying highly targeted audience members for directing advertisement content to across social media channels in accordance with various aspects and embodiments described herein. Repetitive description of like elements employed in respective embodiments is omitted for sake of brevity.

In the embodiment shown, the audience information development component 110 can include audience information extraction component 302, audience refinement component 308 and indexing component 310. The audience information extraction component 302 can be configured to access and search through the various external data sources (e.g., the public target user data sources 102, the private target user data sources 104, and the relevant advertiser data 106) to identify and retrieve information regarding individuals included in a target audience group based in part on information provided by the advertiser identifying or indicating the target audience group. In one embodiment, the audience information extraction component 302 can include relevant feature extraction component 304 and private investigator (PI) engine 306.

The relevant feature extraction component 304 can be configured to employ information provided by the advertiser regarding their desired target audience user profile to identify and retrieve information identifying individuals included in the target audience group. For example, in association with an entity that employs system 100 to find new employees to work at a medical organization, the information provided by the employer may indicate that they are looking to hire registered nurses. According to this example, the relevant feature extraction component 304 can identify and extract information identifying registered nurses using for example, a data source that includes a list of all registered nurses to work in the geographic area of the medical organization. In another example, the advertising entity can provide more specific information regarding their desired audience. For example, in addition to wanting registered nurses, the medical organization could specify that they want registered nurses with over 10 years experience in emergency medicine. According to this example, the relevant feature extraction component 304 can further parse through data sources including employment history information, resume information and the like to further tailor the list of qualified candidates based on the specific target audience criteria.

In association with identifying individuals meeting the target audience criteria, the relevant feature extraction component 304 can further be configured to gather defined feature information for each target user identifying specific match features that can employed by the advertisement campaign component 118 to facilitate matching identified candidates with their social media profiles. For example, in one or more embodiments, in addition to information identify the first and last names of the qualified individuals, this additional feature information can include but not limited to: date of birth, age, gender, physical address, email address, phone number, image data of the user, information regarding their employment history, information regarding their educational history (e.g., schools attended), information regarding their friends/family, etc.

In some embodiments, in addition to extracting information identifying target audience members, the criteria that makes them a qualified audience member (e.g., the individual is a nurse, registered in Ohio, with over 10 years experience in emergency medicine), and one or more of the defined match features, the audience information extraction component 302 can further look for and retrieve a variety of additional discoverable information about the targeted users at the various disparate data sources. In some implementations, such additional information can include information determined or inferred (e.g., using one or more machine learning techniques) to be relevant to the advertisement campaign. In other implementations, the additional information can include any type of discoverable information about at target user that could be useful in association with providing the user with targeted advertisements in other known advertisement campaigns or possible future advertisement campaigns. According to these embodiments, the PI engine component 306 can function as a PI that looks for and extracts such additional information about a target user at various disparate data sources. For example, with respect to the hiring space, information identifying an individual's current employer is useful to facilitate learning an individual' current qualifications. Further, this information can be used by the audience information update component 120 and/or the campaign analysis component 122 to determine if an advertisement intended to hire qualified individuals actually resulted in conversion. However, additional value can also be realized through information about an individual's life that generally is not documented on social media. For example, sometimes employers should not be only interested in getting the next person in the door but finding the person that is going to stay and grow with the company over the years. Accordingly, in some embodiments, the PI engine component 306 can be configured to employ various machine learning techniques to look for, identify, retrieve and develop information about individuals that fills in the gaps regarding an individual's life that is not readily ascertainable via social media. For example, such information could be learned by tracking an individual's employment history, finding information about an individual included in documents published on non-social media sites (e.g., news articles, published literary works, independent personal websites, etc).

The audience refinement component 308 can be configured to cleanse the audience information extracted by the audience information extraction component 302 prior to indexing the information by the indexing component 310 and storing the information for respective target users as developed target user profile data 114. For example, in some implementations, the audience refinement component 308 can remove redundant information, and remove information identifying target users this is too incomplete to facilitate accurate social profile matching (e.g., due to missing match feature information that is considered necessary for matching). In other implementations, the audience refinement component 308 can be configure to identify individuals associated with information that renders them poor or inadequate potential target users. These inadequate candidate can be identified for example based on association with one or more defined characteristics (e.g., they have a criminal record, they write very bad reviews, their associated with an internal black list, etc.). In other implementations, the audience refinement component 308 can employ machine learning techniques to identify conflicting characteristic about a potential target individual based on a particular advertising campaign that renders then unfit candidates.

Figure 4:
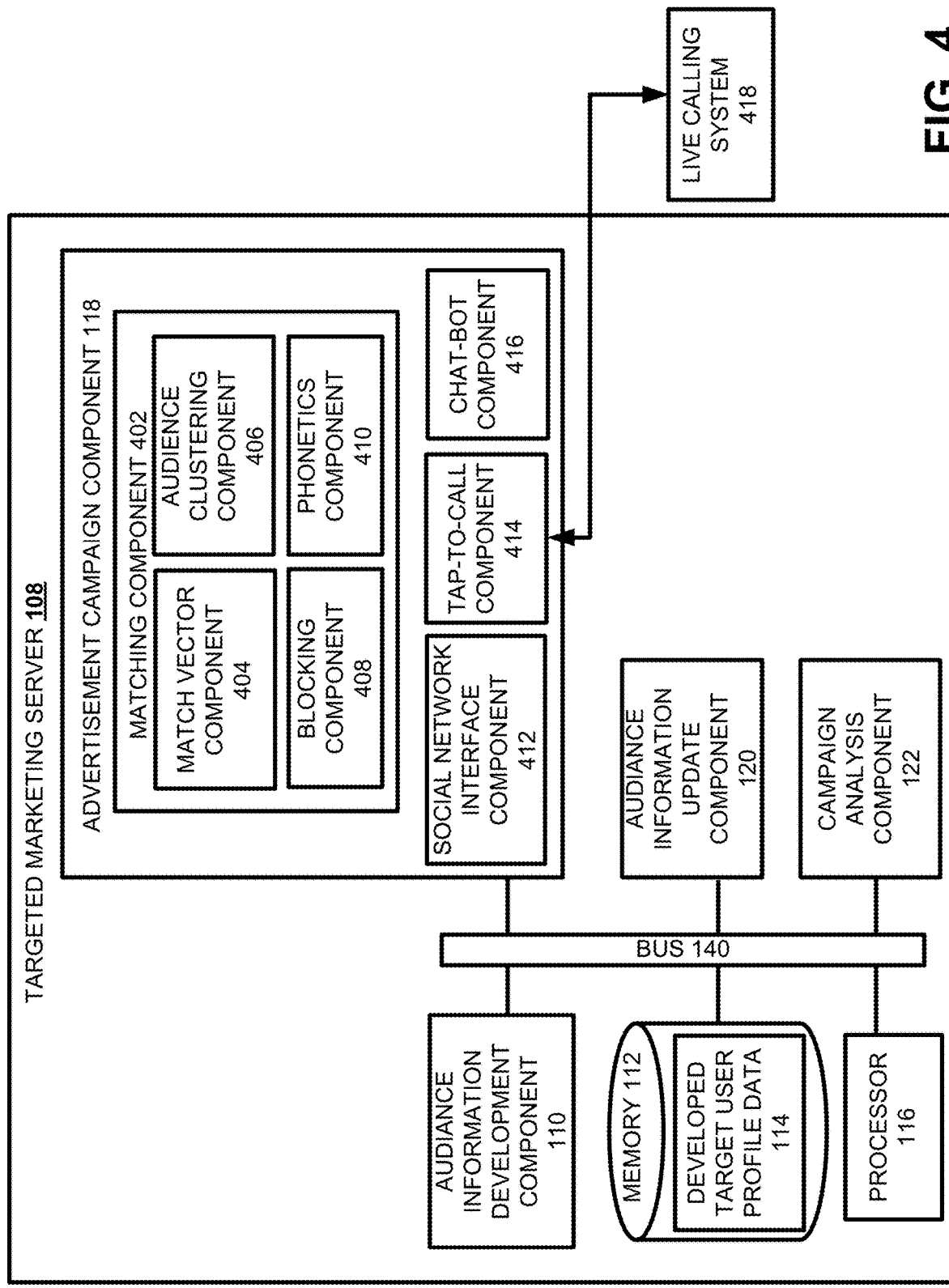
FIG. 4 provides example components of a targeted marketing server that facilitate directing advertisement content to highly targeted audience members across social media channels in accordance with various aspects and embodiments described herein.

FIG. 4 provides example components of the advertisement campaign component 118 of the targeted marketing server 108 that facilitate directing advertisement content to highly targeted audience members across social media channels in accordance with various aspects and embodiments described herein. Repetitive description of like elements employed in respective embodiments is omitted for sake of brevity.

In one or more embodiments, the advertisement campaign component 118 can include matching component 402 social network interface component 412, tap-to-call component 414 and chat-bot component. The match component 402 can be configured to match identified individuals that included in a target audience group with their social network profiles. The matching component 402 can provide various functionalities that facilitate ensuring identified individuals included meeting the target audience criteria for an advertising campaign are matched with a 1-1 or substantially 1-1 ratio with their respective social network profiles at one or more social networking systems 126, and to further ensure that identified target candidates are correctly matched to their social network profiles. In the embodiment shown these functionalities can be performed by the match vector component 404, the audience clustering component 406, the blocking component 408 and the phonetics component 410.

In some embodiments, for respective target users, the match vector component 404 can employ the developed target user profile data 114 to select a set or subset of match features identified and associated with each target user that can facilitate ensuring an accurate 1-to-1 match between the users and their respective social profiles (e.g., information such as their date of birth, middle name, age, gender, physical address, email address, phone number, image data of the user, information regarding their employment history, information regarding their educational history (e.g., schools attended), information regarding their friends/family, etc.). For each (or one or more) target user, in some implementations, the match vector component 404 can further generate data vector that corresponds to a list parameters (and in some implementations a particular order of the parameters), that represent the target user's name (e.g., first and last name), and one or more match features. The matching component 402 and/or the social network interface component 412 can further facilitate applying respective target users match feature vectors to their social media profiles to match the respective target uses with the social media profiles.

For example, given the abundance of users on different social media, the probability of finder a user with such a unique name that is one of kind is nearly zero. For example, as of September 2017, Facebook™ averages nearly 2.01 billion active monthly members, Instagram™ averaging about announced 700 million monthly active users, and Twitter™ trailing not far behind at 328 million monthly active users. Accordingly, information identifying a target audience member's first and last name is rather useless by itself when the goal is to target a specific individual matching a unique and predefined set of target audience criterion (e.g., being a female nurse between the ages of 31- and 45 having an active license to practice in Ohio and having over 10 years experience in emergency medicine). Further, many users on social media employ pseudo names, nicknames or the like when identifying themselves, making it nearly impossible to accurately match only their legal name to their social network profiles. Accordingly the match feature information disclosed herein is an essential tool to facilitate accurately matching target audience users with their social profiles.

The particular set or subset of match features employed to match a target user to their social profile can vary based on a variety of factors. For example, in some implementations, the match vector component 404 can be configured to use all identify match feature for a particular target user. In other implementation, the match features can be associated with different degrees of targeting specificity. For example, a user's data of birth can be considered substantially more powerful for identifying a person's social network profile relative to their middle name. With this implementation, the match vector component 404 can be configured to select the top N (e.g., 2, 3, 5, etc.) match features. For example, in some implementations, using a greater number of potential match features used may hinder accurately identifying a target user's social profile if the social networking site requires all match features to match the user's profile and the user may have not included one or more of them in their profile. In other embodiments, the particular set or subset of match feature selected by the match vector component can be tailored to different social networking systems. For example, when matching an identified target user to their social network profile on Facebook™, the combination of match features including date of birth, location, and school attended may result in higher probability matching relative to the combination including date of birth, location and image of the user's face (in implementations in which image recognition can be employed to facilitate direct matching between know image data of the user and image data of the user included in the social network profile). However, the later combination may result in a higher probability matching for Instagram™. In some implementations, the particular match feature combinations that work based with different social media networks can be predefined. In other implementations, the match vector component 404 can determine and optimize these match feature combination over time using machine learning.

In some embodiments, the audience clustering component 406 can cluster the identified target audience members into two or more different clusters based on distinguishing and relevant attributes and compare the respective clusters to the social media systems separately. For example, in some implementations, depending on the particular advertisement campaign, an advertiser can be interested knowing not only what user's matched, but what user's matched that are associated different subsets of attributes. For example, with respect to recruiting registered nurses, in the qualified target user can be clustered based on experience level, such as those having less than one year experience, those having between one to five years experience, those having between five and ten years experience and those having more than ten years experience. According to this example, the matching component 404 can specifically determine which users in each group matched, or at least the percentage of users in each group that matched. (e.g., 100% matched users in the first group, 98% matched in the second group, etc.). In some implementations, the clustering component can control the number or target users in each cluster for matching with social network profiles based on minimum threshold requirements applied by a social network system prior to proceeding with authorizing proceeding with targeted advertising to the requested group. For example, if a social network system requires a third party advertiser to have 30 or more matching candidates prior to authorizing targeted advertisements to the respective candidates, the clustering component can limit the number of members in each cluster to 30. In this way, if the cluster is denied, then the matching component 402 will know at least one member did not match. The clustering component can further increase the number of members in the cluster at incremental levels (e.g., 31, then 32, then 33, etc.), or generate different clustering of members to propose to maximize the total number of known 1-1 matches that are ultimately identified in from the total target group list. Still in other implementations, the audience clustering component 406 can cluster target user into smaller groups based on one or more distinguishing characteristics to improve processing time in and matching efficiency.

The blocking component 408 can similarly apply a blocking technique in to improve matching efficiency and to restrict knowledge of unmatched individuals to defined groups. In this regard, rather than clustering user by specifically selected meaningfully criteria associated with different attributes of the target audience, the blocking component 408 can apply a more simplified method of grouping individuals be arbitrary factors. For example, in some implementations, the blocking component 408 can restrict the number of target users to be submitted for matching with their social media profiles based on the first letter of their first name, last name, middle initial, or the like. For example, in one implementation, the blocking component can group target users by first letter for their last name and submit the respective groups for matching with their social media profiles separately. This minimize processing back log yet allow the matching component to efficiently determine which specific individuals are included in respective submitted groups.

The phonetics component 410 can facilitate breaking target user names (e.g., their extracted names or legal names), into phonetic pieces to facilitate matching users with their social media profiles. In this regard, the phonetics component 410 can compare two character strings, for example, (Nicholas to Nicolas, missing 1 letter difference) to minimize the possibility of mismatching an individual with a different phonetic representation of a same or similar name. On the other hand, in some implementations, the extracted name for a particular individual may be the wrong phonetic spelling. In this regard, even if the additional match features (e.g., date of birth, age, location, etc., match, the name extracted for an individual and the name employed by the individual on their social media page may not match by a small degree, in these scenarios, the phonetics component 410 can work in the reverse and determine that for example a Geoff matches with a Jeff, because of the substantial similarity in phonetics of the respective names and the high match percentage between two or more additional match features.

The social network interface component 412 can facilitate interfacing with different social networking systems 126 as well as different platforms (e.g., mobile vs. desktop) to provide for matching target audience members with their respective social media profiles and to deliver advertisements to these members via their social networking profiles.

In some implementations, these targeted advertisements can include a tap-to-talk functionality and/or a chat-bot functionality, which can respectively be provided by the tap-to-call component 414 and the chat-bot component 416. The tap-to-call functionality can include a selectable widget that is displayed in-ad which upon selection, established a connected call or media session with a call service associated with the advertisement. For example, in implementations in which the advertisement is directed to a CDL truck driver, the call service can provide additional information about an advertisement that is advertising for new positions. In the embodiment shown, this call service is external to the targeted marketing server 108 and provided by a live calling system 418, however it should be appreciated that the call service can be internal to the targeted marketing server 108 and/or machine automated.

Figure 5:
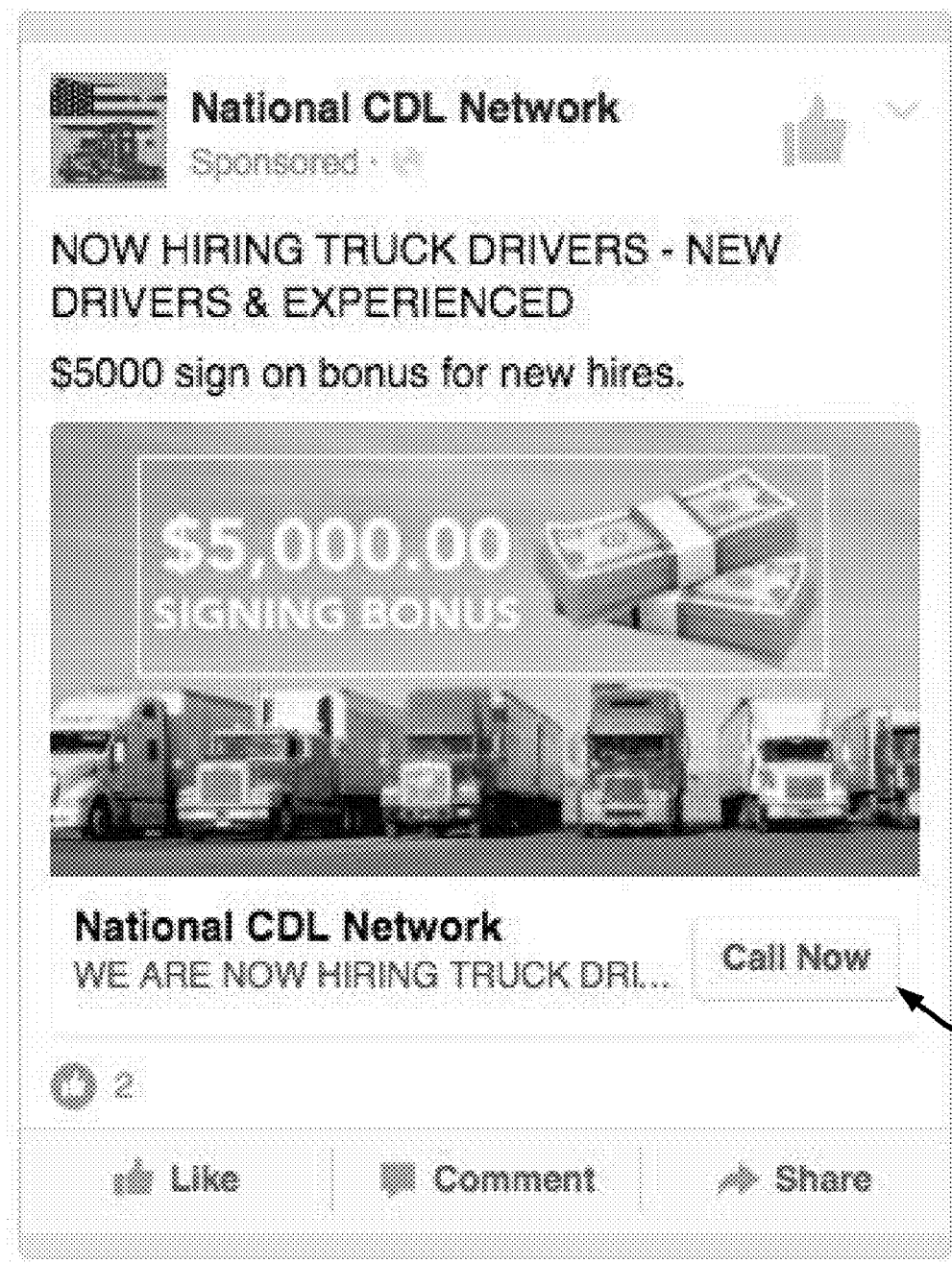
FIG. 5 provides an example targeted advertisement that includes a tap-to call functionality in accordance with various aspects and embodiments described herein.

For example, FIG. 5 provides an example targeted advertisement 500 that includes a tap-to call functionality in accordance with various aspects and embodiments described herein. The advertisement includes a "call now" icon that when selected can result in place a call between the user's device and a call service providing additional information about the advertised National CDL Network hiring campaign. These types of advertisements not only provide for enhanced user engagement and more efficient conversion rates, but further provide for gaining immediate feedback regarding the target user's response to the advertisement. In addition, the actual audio recording of the conversation can be evaluated in real-time to determine information regarding the user' mental state, intention, and the like.

With reference back to FIG. 4, the chat-bot functionality can provide the user with an interactive artificial intelligence chat session related to an advertisement. In this regard, advertisements with a chat-bot functionality can include a messaging icon which upon selection, can generate a "live" chat session with an AI machine that is specifically trained to response to different types of user feedback and provide the user with appropriate relevant answers. Similar to the live voice call of the tap-to-talk functionality, the chat-bot functionality further engages the user and improves conversion rates. In some implementations, with recruiting applications, the chat-bot functionality can initiate a preliminary interviewing process that can be used to vet potential candidates that may be unqualified or unsuitable. The text conversations of the chat-bot sessions can also be analyzed (e.g., by the audience information update component 120) to learn additional information about the sentiment, mental state and intention of the target user.

Figure 6A:
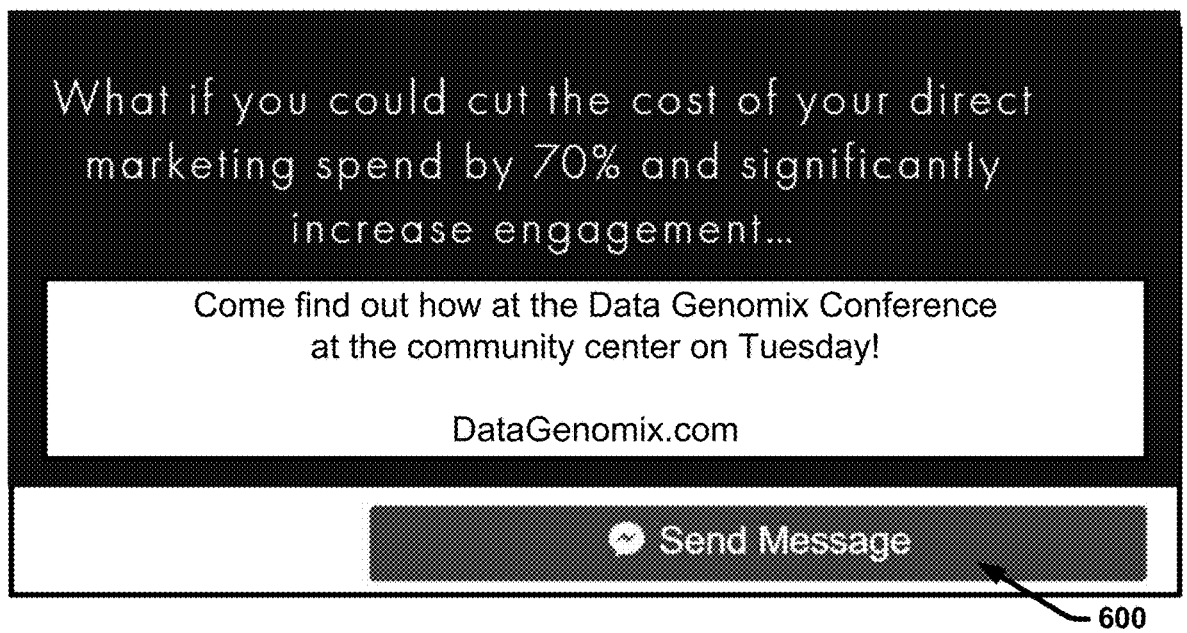
FIGS. 6A-6F illustrate an example chat-bot functionality that can be provided with social media advertisements in accordance with various aspects and embodiments described herein.

FIGS. 6A-6F illustrate an example chat-bot functionality that can be provided with social media advertisements in accordance with various aspects and embodiments described herein. FIG. 6A illustrates and example advertisement for the company DataGenomix that prompts targeted users to come to an upcoming conference about the companies' services on Tuesday. The advertisement also includes a send message icon 600 that allow the user select to send Data-Genomix a message.

Figure 6B:
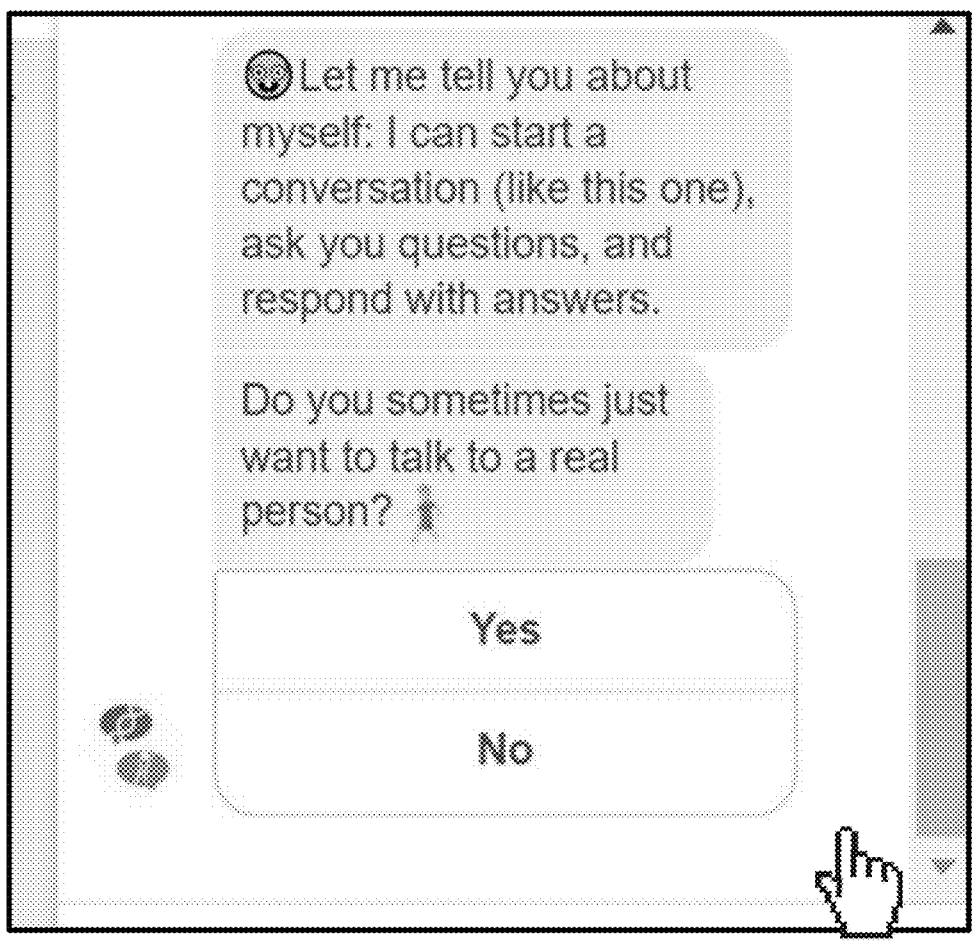

FIG. 6B presents an example chat-bot interface generated in response to the send message function from the advertisement displayed in FIG. 6A. The chat-bot interface reflects a traditional live chat, however the entity the user is chatting with is actually an AI chat-bot machine that has been specifically trained to respond to user specific input in an natural and user friendly manner while providing the user with additional information. For example, as shown in FIG. 6B the chat bot machine begins the conversation by introducing itself and asking the user a yes or no question to get a feel for the user's mental state regarding chatting with a machine.

Figure 6D:
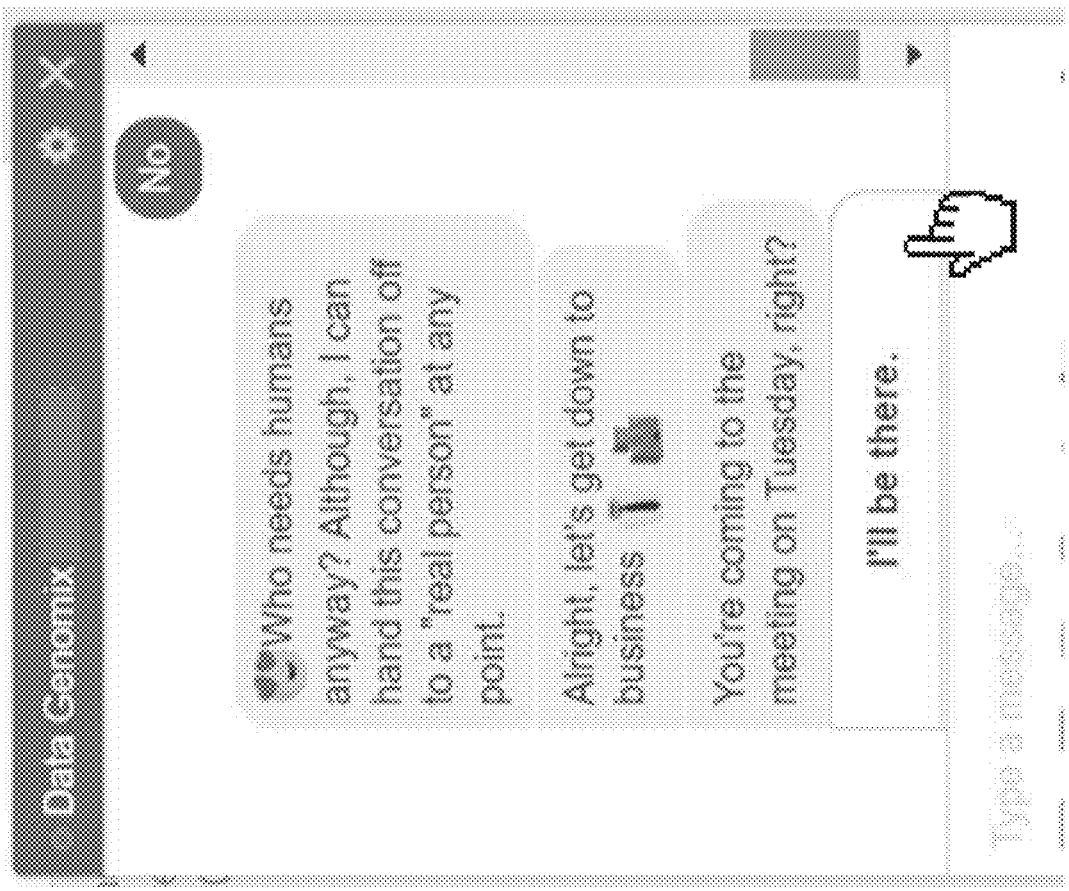
Figure 6C:
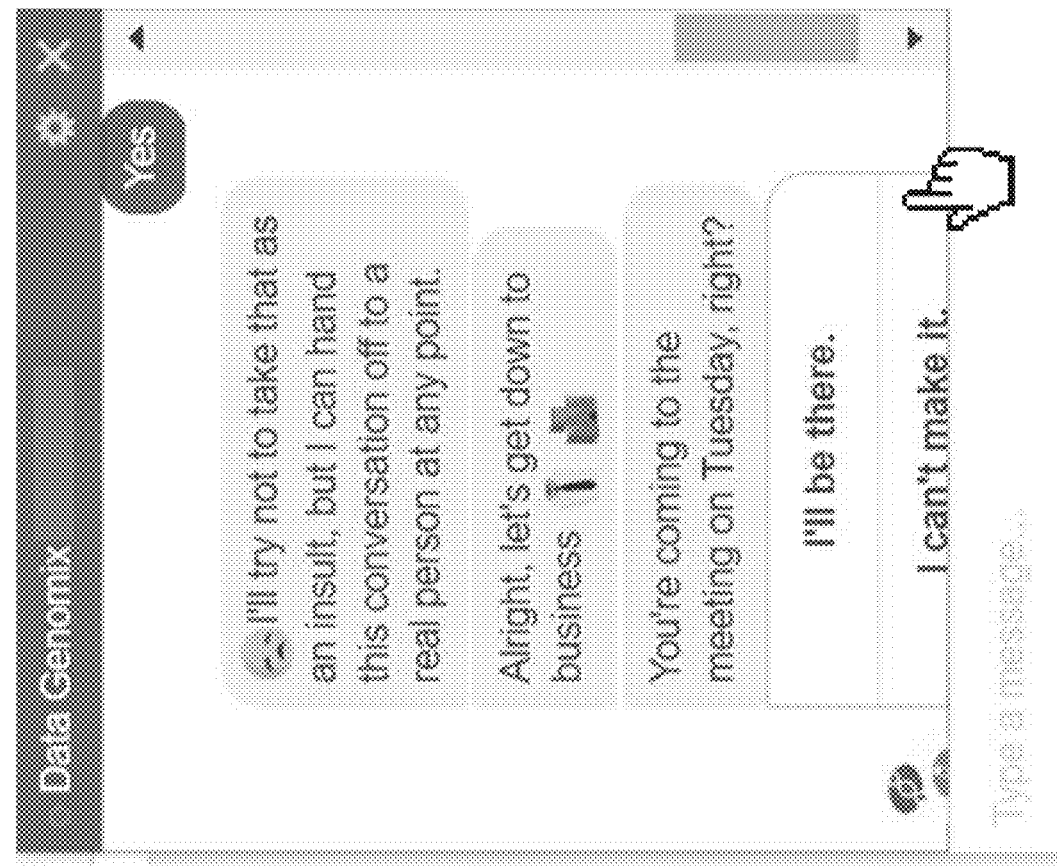

FIG. 6C shows a response generated by the chat-bot machine in response to reception of user input answering "yes" to the question proposed in FIG. 6B, and FIG. 6D shown a response generated by the chat-bot machine in response to reception of user input answering "no" to the question proposed in FIG. 6B. The chat-bot further presents the user with an additional question asking the user whether he or she will be at the meeting on Tuesday and allows the user to respond in the affirmative or the negative.

Figures 6E, 6F:
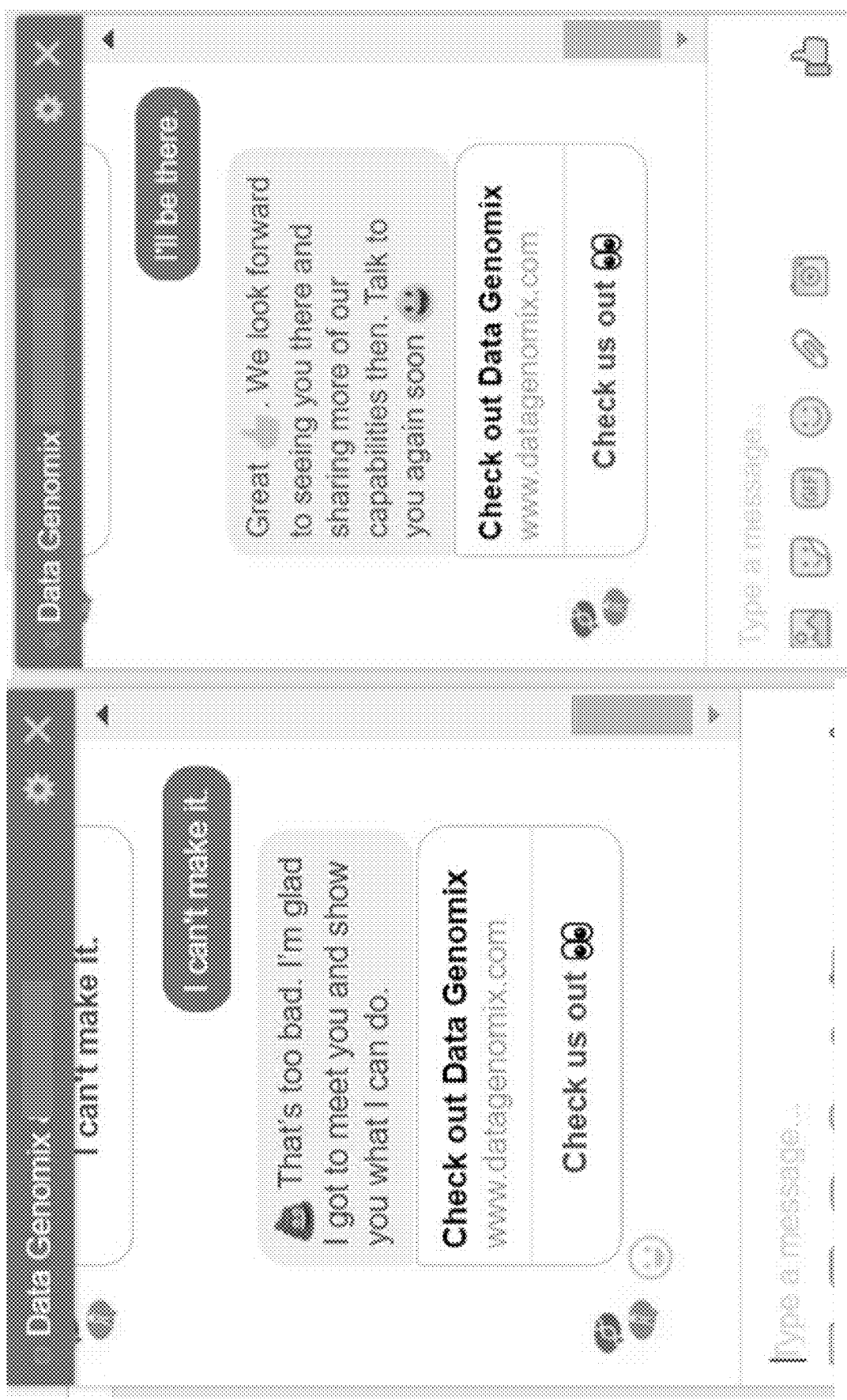

FIG. 6E shows an example response generated by the chat-bot machine in response to reception of user input indicating he or she won't make it to the meeting and FIG. 6F shows an example response generated by the chat-bot machine in response to reception of user input indicating he or she will make it to the meeting.

Figure 7:
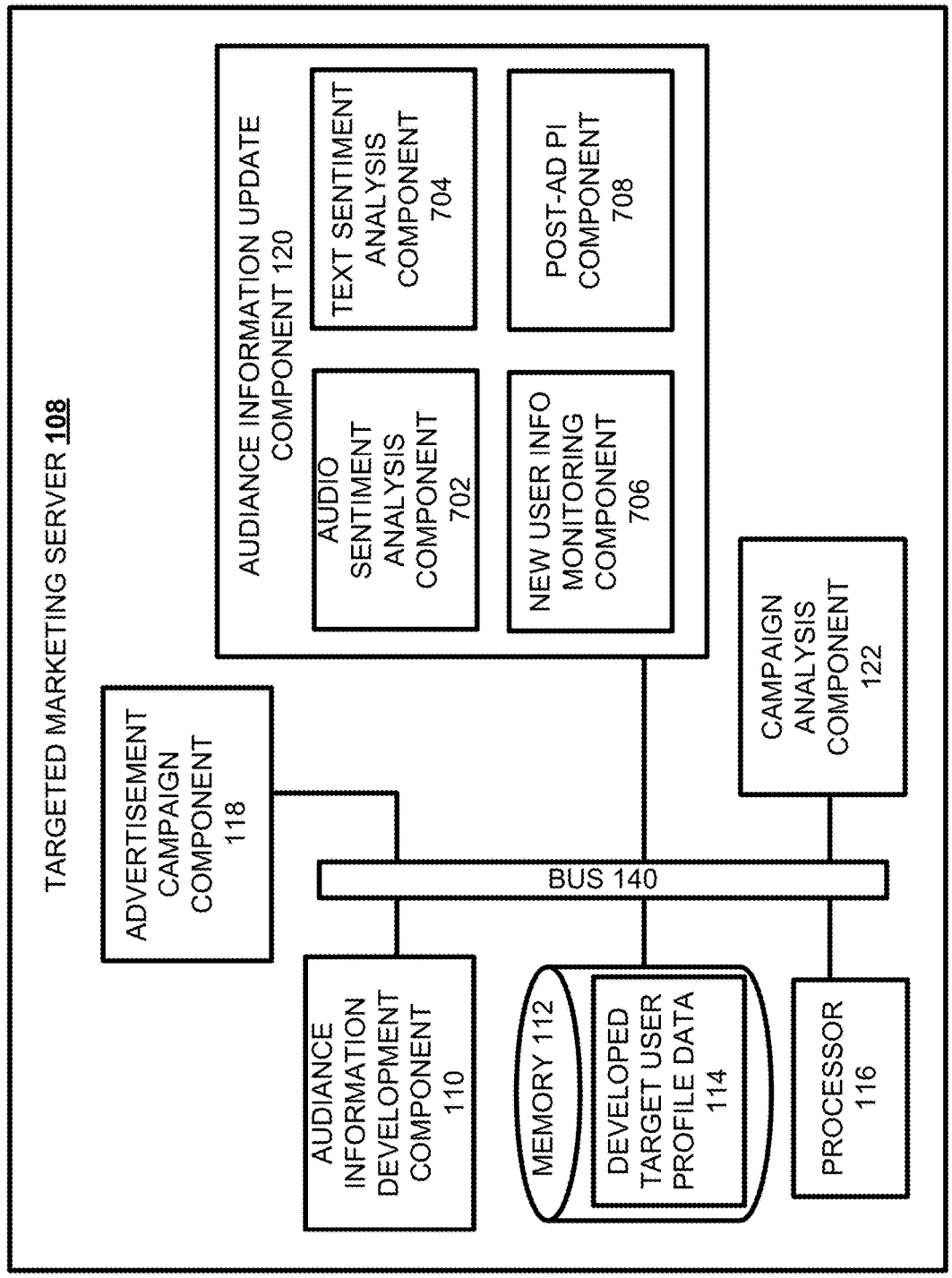
FIG. 7 provides example components of a targeted marketing server that facilitate updating audience information based on information associated with their social media profiles and their responses to targeted advertisements in accordance with various aspects and embodiments described herein.

FIG. 7 provides example components of the audience information update component 120 of the targeted marketing server 108 that facilitate updating audience information based on information associated with their social media profiles and their responses to targeted advertisements in accordance with various aspects and embodiments described herein. Repetitive description of like elements employed in respective embodiments is omitted for sake of brevity.

The audience information update component 120 can be configured to process any and all data that can be gathered and/or learned about a target audience member after making a connection with the target audience member via their social network profile to facilitate enriching the target user's profile data stored locally in memory 112 (e.g., as developed target user profile data 114). The target marketing server 108 can further employ the enriched target user profile data to further tailor and optimize delivering future target advertisements to the user in association with the same target advertisement campaign or another campaign. For example, audience information update component 120 receive and process information regarding a user's reactions to a targeted advertisements to determine the user's interests in the advertisement, the user's interest n actually acting upon the target advertisement (e.g., applying for the job, attending the conference, buy the product), and the like. In the embodiment shown, the audience information update component 120 can include the audio sentiment analysis component 702 to analyze recorded audio associated with a tap-to call session to determine this type of information from the user's conversation and automatically update the user's profile with such information. Similarly, the text sentiment analysis component 704 can also analyze text conversions generated in association with chat-bot sessions to learn information about the user's intentions, mental state, and the like regarding specific advertisement content.

The audience information update component 120 can also include a new user information monitoring component 706 to monitor and extract new information that can be learned about a target user via the social network data pipeline include both static and dynamic social network data 126 and add this new information to the respective target users' local profiles.

Further in some implementations, the audience information update component 120 can include a post-ad PI component 708 that can be particularly configured to look for specific information regarding a user's "offline" or non-social media based behavior that is related to a targeted advertisement that was provided to the user or the reason why the user was targeted for the advertisement in the first place. In this regard, many social media targeted advertising techniques deliver advertisements to users based on information that can be readily learned from the social media and/or web-browsing activity. For example, based on a user's relationship status changing to being to "single" to "engaged" the user is often inundated with wedding advertisement on her social media channels for various wedding services. However, often times, the advertisements are irrelevant to her needs based on information that cannot be determined directly or easily from her social media activity or web browsing activity. For example, the user may be repeatedly targeted with advertisements for wedding photographers. However, these advertisements are useless if the user has already booked a weeding photographer, if the user has booked a venue with an in-house photographer, if the user has booked a venue at location where the advertised photographers do not travel, or if the user's wedding date has come and gone!

In this regard, the post-ad PI component 708 can be configured to follow up on these types of relevant details that would have an influence on whether to send the user a same or similar advertisement and also what advertisement to send next. For example, based on information indicating the user is engaged and has received an advertisement for a photographer, the post-ad PI component 708 can be configured to access and parse through various non-social media data sources (e.g., the public target user data sources 104) to identify and extract revenant information about the user (e.g. relevant text data, media data and the like) that can provide additional insight about the users progress with hiring a wedding photographer and whether one is still needed and whether to continue targeting the user with wedding photograph advertisements. Likewise, the post-ad PI component 708 can further find additional relevant information related to the purpose of the advertisement to facilitate determine other appropriate advertisements to send the user. For example, based on learning the user has booked a venue in Hawaii (which was learned by the post-ad PI component in response to investing information at non-social media sources about the user regarding wedding updates in response to targeting the user with a wedding photography advertisement), the post-ad PI component can update the user's local profile data with this information. As a result, the targeted marketing server 108 can employ this information to determine other relevant advertisement to send the user. The targeted marketing server 108 can further determine whether to stop sending the user advertisements that have become irrelevant (e.g., an advertisement for a wedding photographer in Miami, Fla.).

Figure 8:
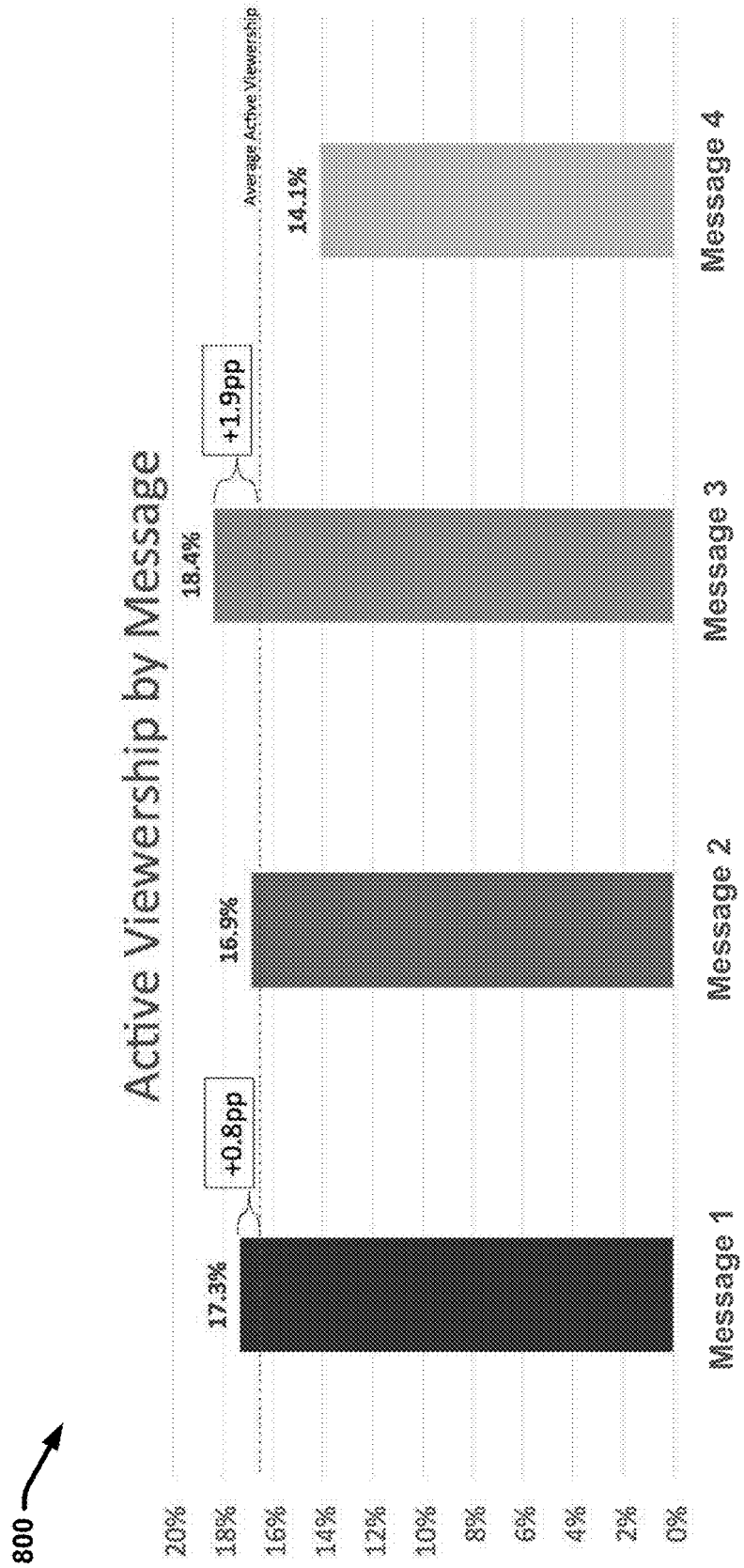
FIGS. 8-12 present example charts and graphs illustrating types of key performance indicator (KPI) analytics regarding a targeted advertisement campaign in accordance with various aspects and embodiments described herein.
Figure 9:
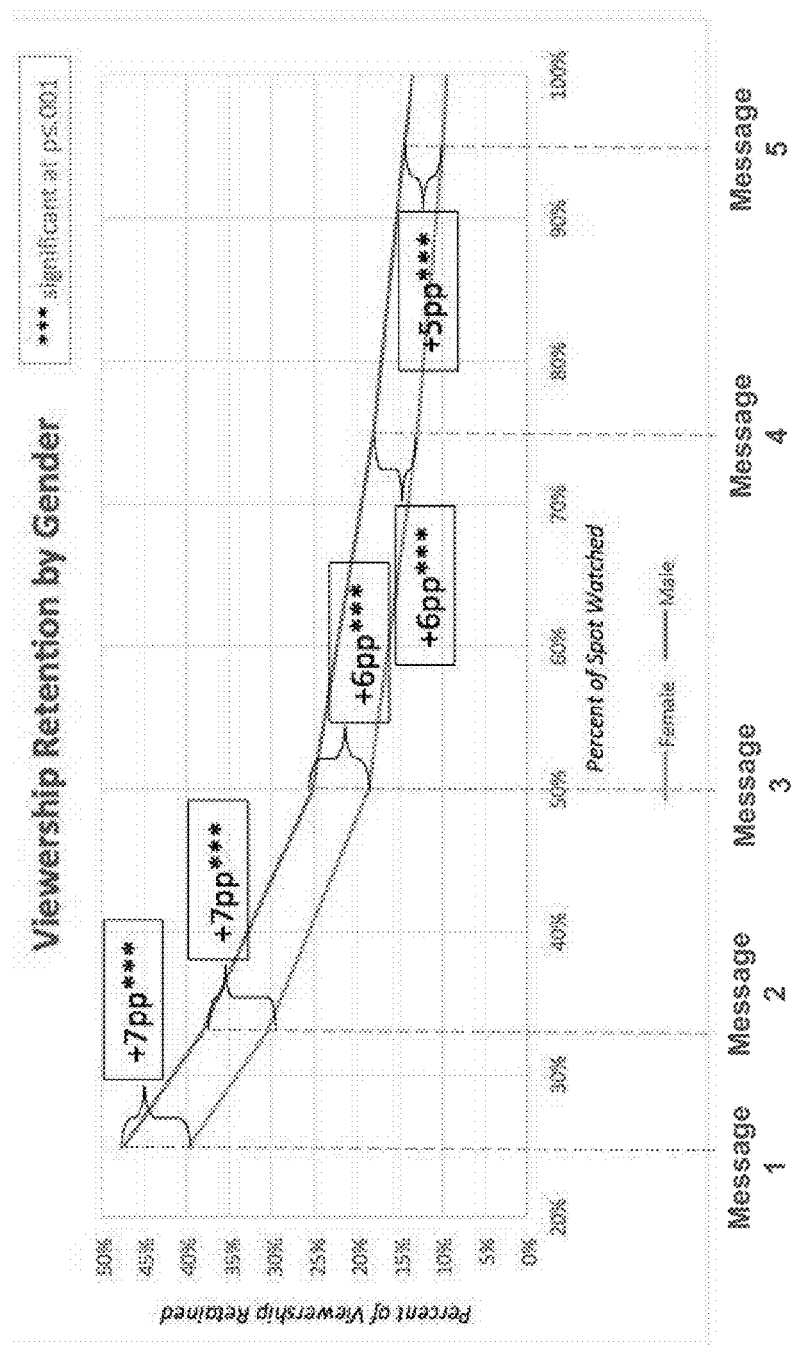
Figure 10:
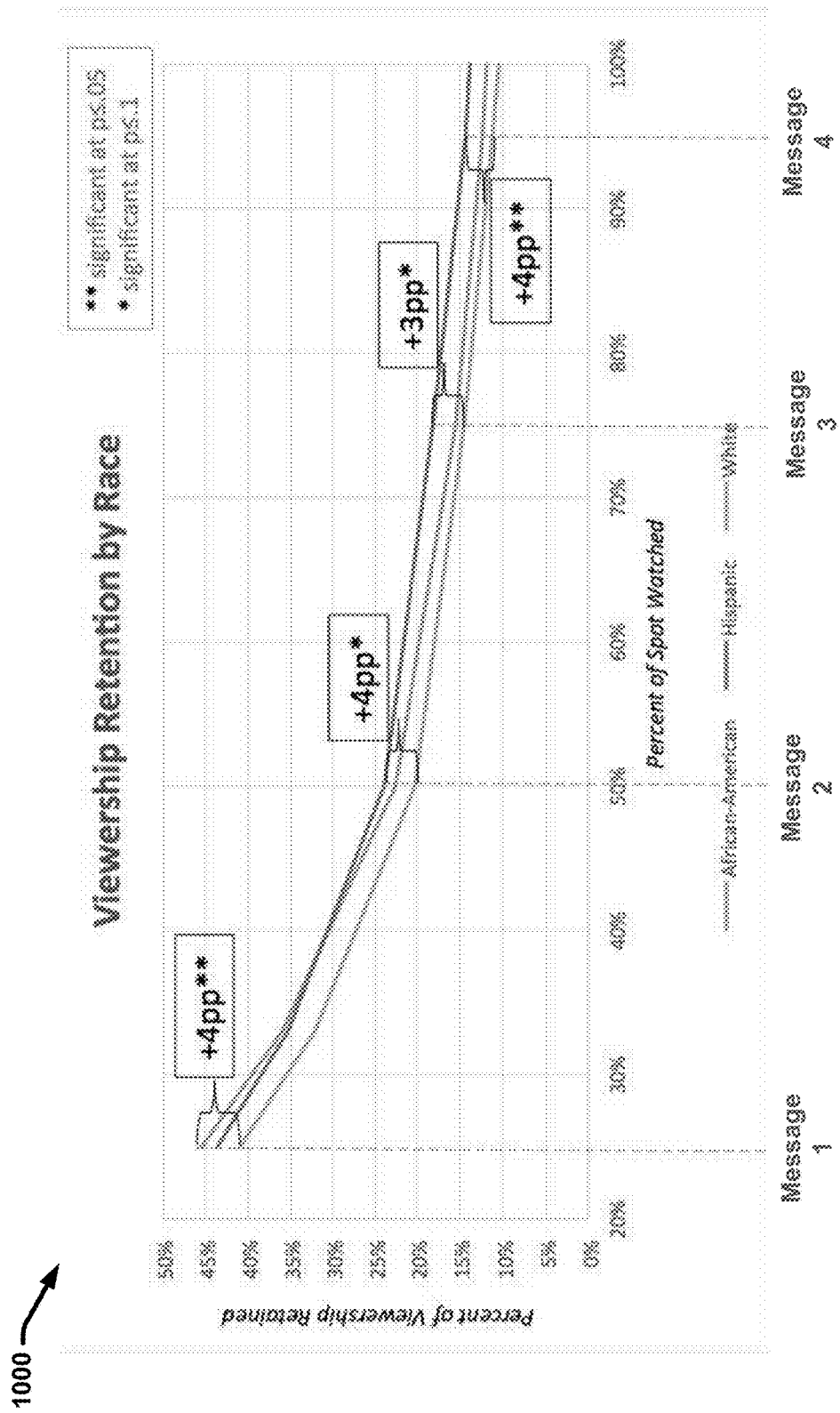
Figure 11:
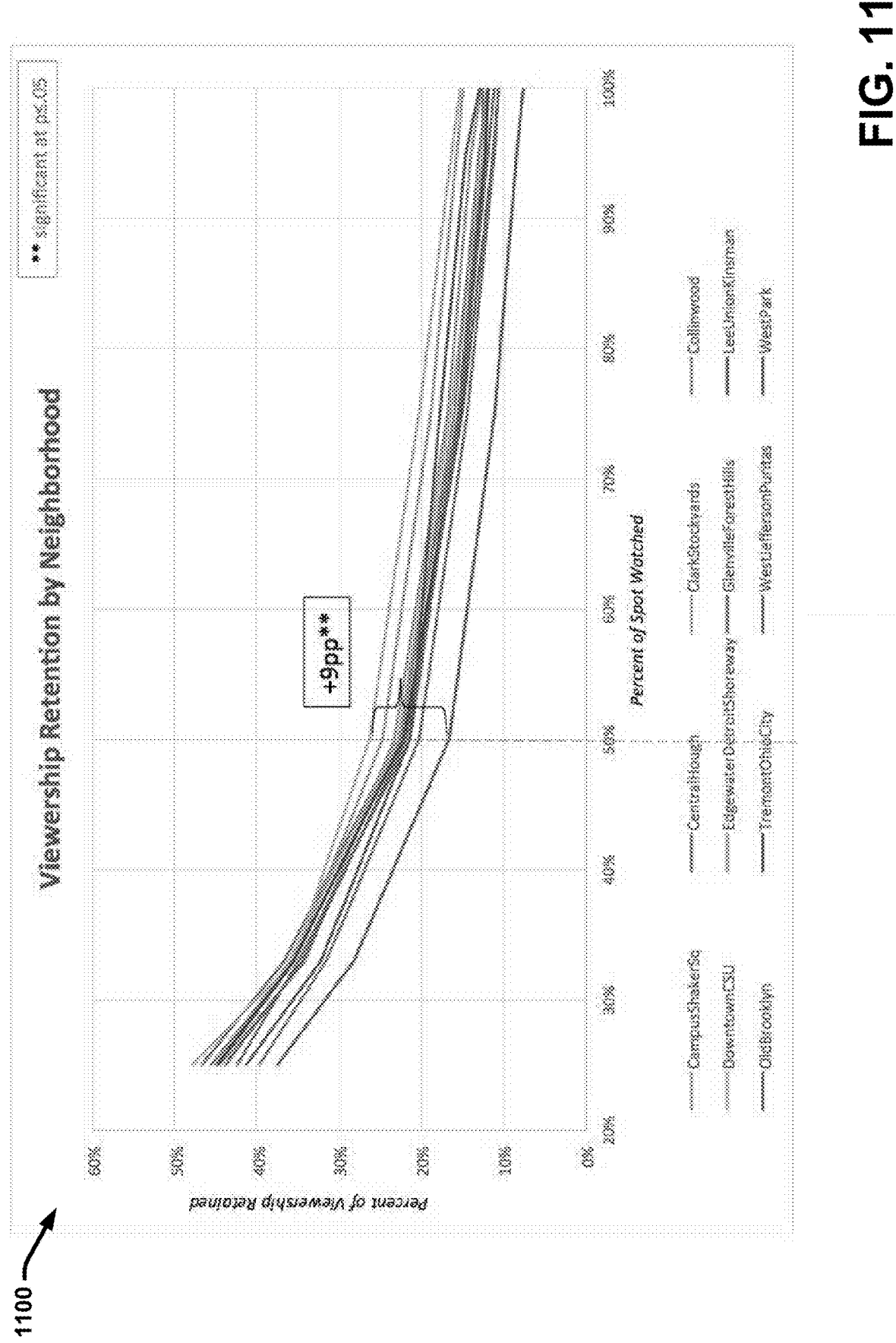
Figure 12:
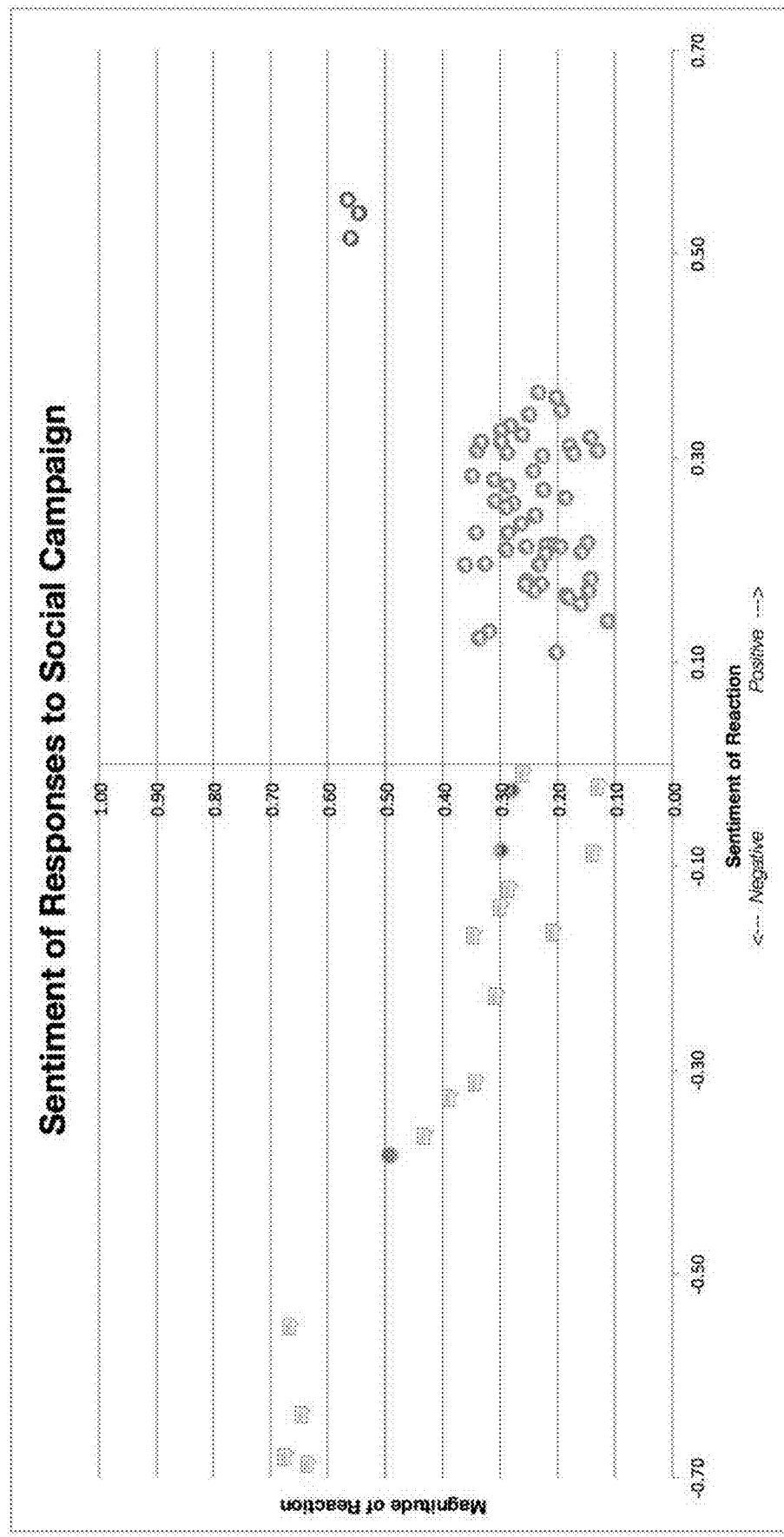

FIGS. 8-12 present example charts and graphs illustrating types of key performance indicator (KPI) analytics regarding a targeted advertisement campaign in accordance with various aspects and embodiments described herein. In various embodiments, these charts and graphs can be generated by the campaign analysis component 122 and provided to the advertiser/entity behind an advertisement campaign to provide visual feedback regarding the performance of the advertisement campaign. For example, FIG. 8 presents an example graph 800 illustrating active viewership (e.g., interest) percentages associated with different types of political advertisements for a same political campaign, providing insight into what type so messages are more appealing to target voters in general. FIG. 9 presents an example graph 900 illustrating viewership retention of a video advertisement by gender. FIG. 10 presents an example graph 1000 illustrating viewership retention by race. FIG. 11 presents an example graph 1100 illustrating viewership retention by neighborhood, and FIG. 12 provides an example chart 1200 illustrating sentiment of responses to a social campaign.

Figure 13:
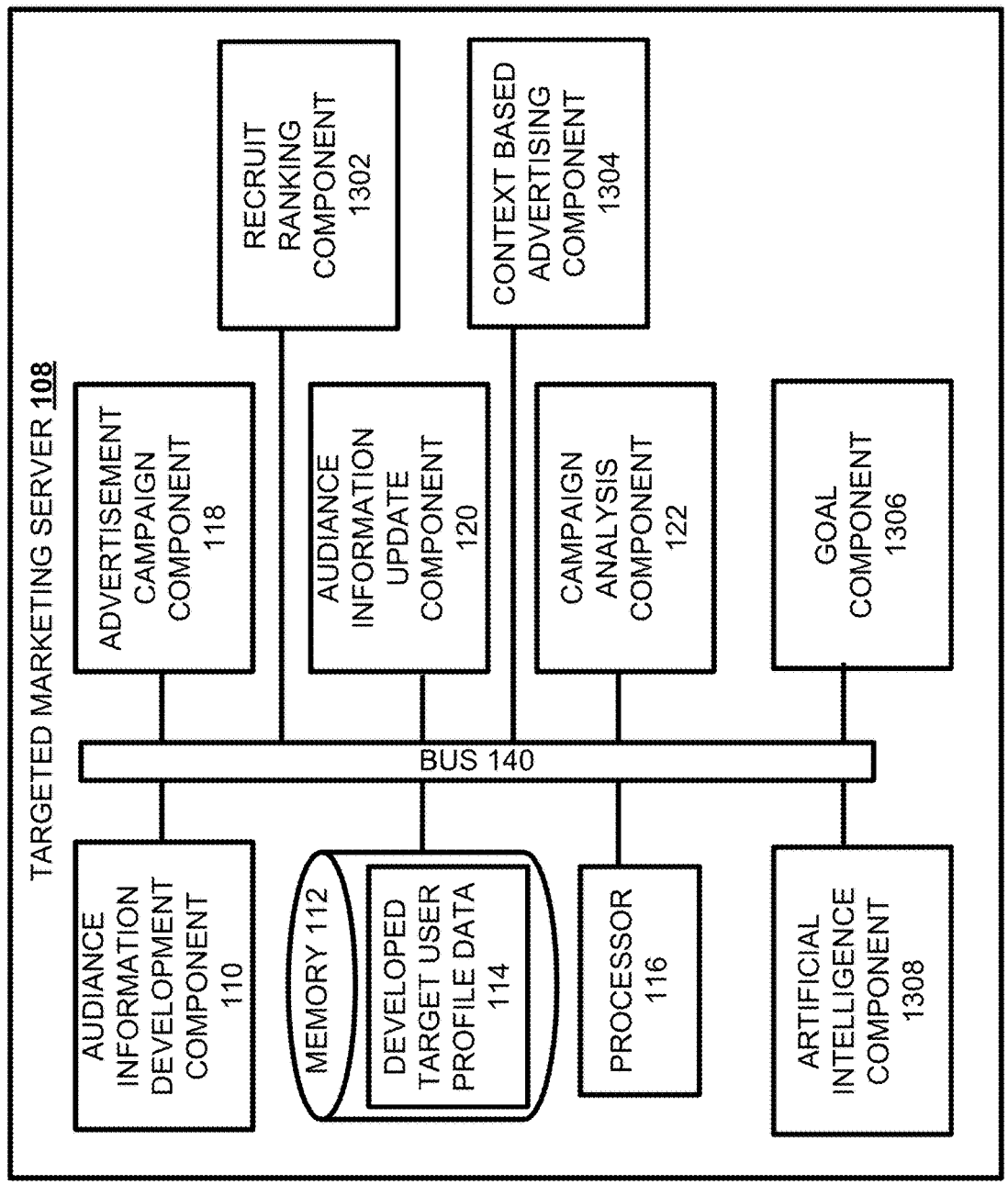
FIG. 13 provides some additional example components of a targeted marketing server that facilitates highly targeted advertising to identified audience members across social media channel in accordance with various aspects and embodiments described herein.

FIG. 13 provides some additional example components of the targeted marketing server that facilitates highly targeted advertising to identified audience members across social media channel in accordance with various aspects and embodiments described herein. Repetitive description of like elements employed in respective embodiments is omitted for sake of brevity.

In the embodiment shown, the target marketing server 108 further includes recruit ranking component 1302, context based advertising component 1304, goal component 1306, and artificial intelligence component 1308.

In association with advertisement campaigns directed to identifying new recruits for hire, the recruit ranking component 1302 can employ various machine learning techniques to optimize the criterion employed to establish the target audience group based on ranking information associated with either hypothetical target users or previously matched target users. For example, in some embodiments, the target marketing server 108 can constrain recruiting searches to candidates meeting a defined set of criterion. However, the particular criterion to apply can vary and eventually be optimized using machine learning based on the employers reflection on the individuals that are included in the identified target audience pool. For example, with respect to health care recruiting, a healthcare employer can request target candidates that meet the criteria of being licensed professionals and the target marketing server can generate this list. However, the recruit ranking component 1302 can be employed to even further learn additional characteristics of target candidate that further ensures identifying individuals that are better fitting candidates for them.

In one implementation, the recruit ranking component 1302 can provide the employer with information identifying different candidates with different qualities and allow the employer to rank the respective candidates with a score indicative of fitting the candidate is for the employer's needs. This crop of candidates can be hypothetical candidates or previously identified candidates. Based on the rankings applied to different candidate profiles, the recruit ranking component 1302 can train a machine learning model to identify those profile characteristics that are best fitting and further limit the target audience to only those candidates matching the learned profile. This model training could further be transplanted to other verticals, include other types of recruiting campaigns and advertisement campaigns directed to sales, politics, and the like.

The context based advertising component 1304 can provide for real-time context based advertising with respect to matched target users using context information (e.g., context data 136) regarding their current context. For example, based on context information indicating its 5 pm and a particular target user is heading out to meet his sports buddies out for drinks (as gleaned in part from the recent social media posts), the context based advertising component can determine that this is an opportune time to target the user and his sports buddies a and you know these are my sports buddies, and this might be an opportune time to target these sports buddies with information encouraging them to attend a new sports bar that having a grand opening in the area opening.

The goal component 1306 can also employ context data (e.g., context data 136) as well as social network data 128 and other relevant monitored real-time information to further tailor delivering targeted advertisements to individuals based defined goals of an advertiser campaign defined for an advertiser that employs the targeted marketing server 108. For example in one embodiment, the goal component 1304 can define a target audience group based on an identified context associated with user behavior of individuals and a particular marketing goal of an advertiser. In this regard, the goal component can employ machine learning techniques to identify a current or upcoming event or scenario that involves a group of individuals participating in activity or being collocated at a particular location that makes them good targets for a particular advertisement campaign goal that the targeted marketing server 108 has been configured to server. These individuals can include target users for which the targeted marketing server 108 has previously developed profile information (e.g., as developed target user profile data 114) as well as new target users. The goal component 1306 can further direct the advertisement campaign component 118 to match these individuals with the social media profiles to specifically deliver advertisements that are relevant to the group, relevant to the context/event/location, and intelligently timed for delivery based on the context/event/location. For example, with respect to a marketing campaign directed to medical professional, the goal component 1306 can determine based on context data 134 and social network data 128 that there is a physician conference somewhere in Atlanta coming up in two weeks, and this would be a good opportunity to maximize experience and sales and revenue from all levels. According to this example, the goal component can employ information regarding a list of attendees to define a target audience group of those attending the conference to facilitate sending targeted advertisements to these individuals via their social media profiles that is also relevant to the conference (with respect to location, timing, purpose, etc.). In some implementations, the goal component 1306 can also direct the audience information development component 110 to find specific characteristics of the attendees, related to the conference, types of medical professionals attending, their affinities and the like.

Various aspects of the disclosed subject matter can employ artificial intelligence or machine learning to facilitate making inferences regarding characteristics of qualified target audience members that meet an advertisers goals, where to identify these target audience individuals and their relevant match attributes in non-social media based data sources, what additional information to extract about the target audience individuals, how to apply the extracted information to match the respective individuals with their social media profiles, what advertisements to direct to certain individuals and when, and the like. In this regard, the targeted marketing server 108 can employ artificial intelligence component 1308 to facilitate making these inferences by applying various machine learning or AI techniques. Machine learning is a type of AI that provides computers with the ability to learn without being explicitly programmed. In order to provide for or aid in the numerous inferences described herein, the AI component 1308 examine the entirety or a subset of the data to which it is granted access and can provide for reasoning about or infer states of the system (e.g., system 100 and the like), environment, etc. from a set of observations as captured via events and/or data. An inference can be employed to identify a specific context or action, or can generate a probability distribution over states, for example. The inference can be probabilistic (e.g., the computation of a probability distribution over states of interest can be based on a consideration of data and events). An inference can also refer to techniques employed for composing higher-level events from a set of events and/or data. Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x4, x4, xn)$, to a confidence that the input belongs to a class, such as by $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 14:
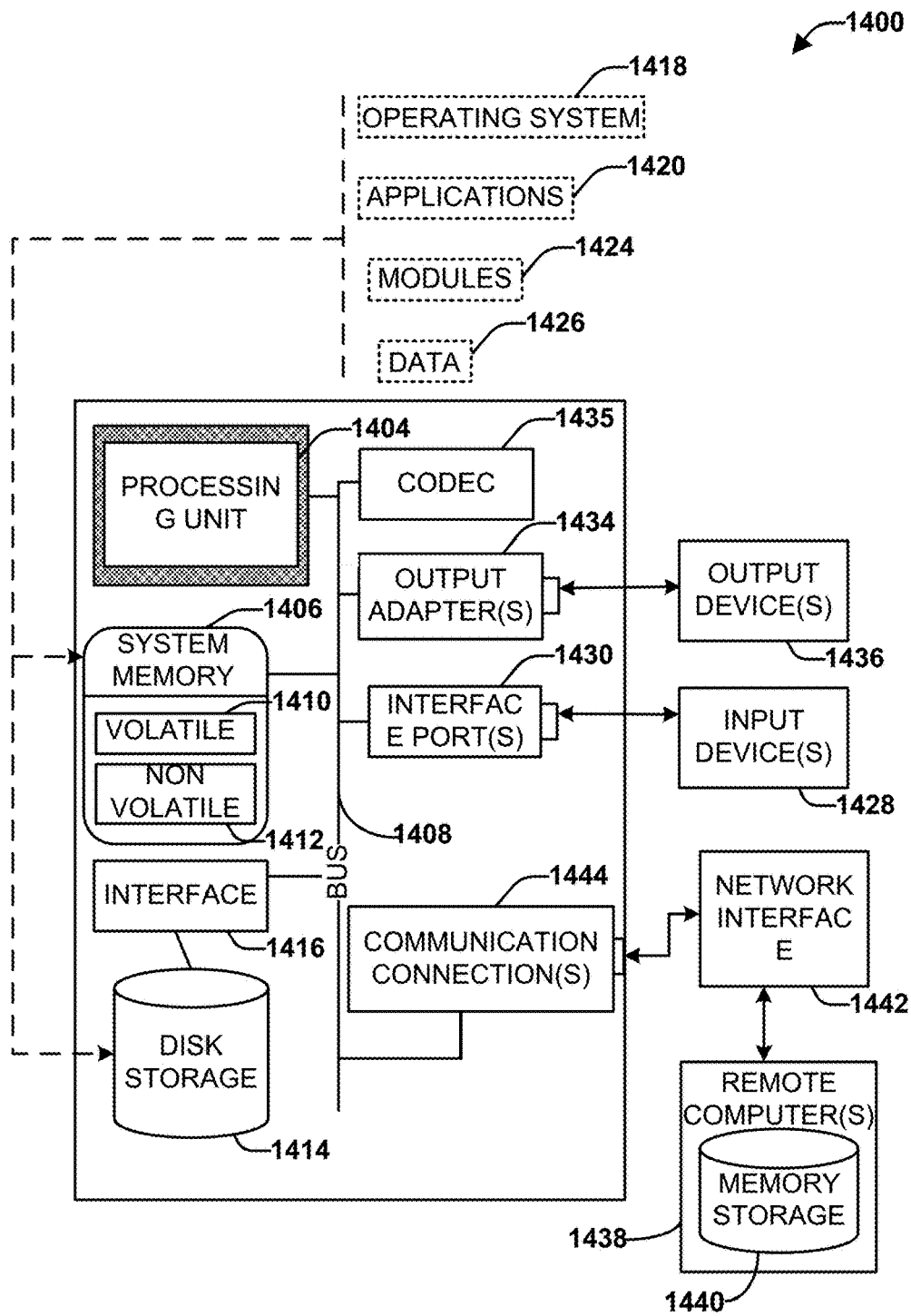
FIG. 14 is a schematic block diagram illustrating a suitable operating environment in accordance with various aspects and embodiments.

With reference to FIG. 14, a suitable environment 1400 for implementing various aspects of the claimed subject matter includes a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13144), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to present innovations, codec 1405 may include at least one of an encoder or decoder, wherein the at least one of an encoder or decoder may consist of hardware, a combination of hardware and software, or software. Although, codec 1405 is depicted as a separate component, codec 1405 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s). Thus, for example, a USB port may be used to provide input to computer 1402, and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
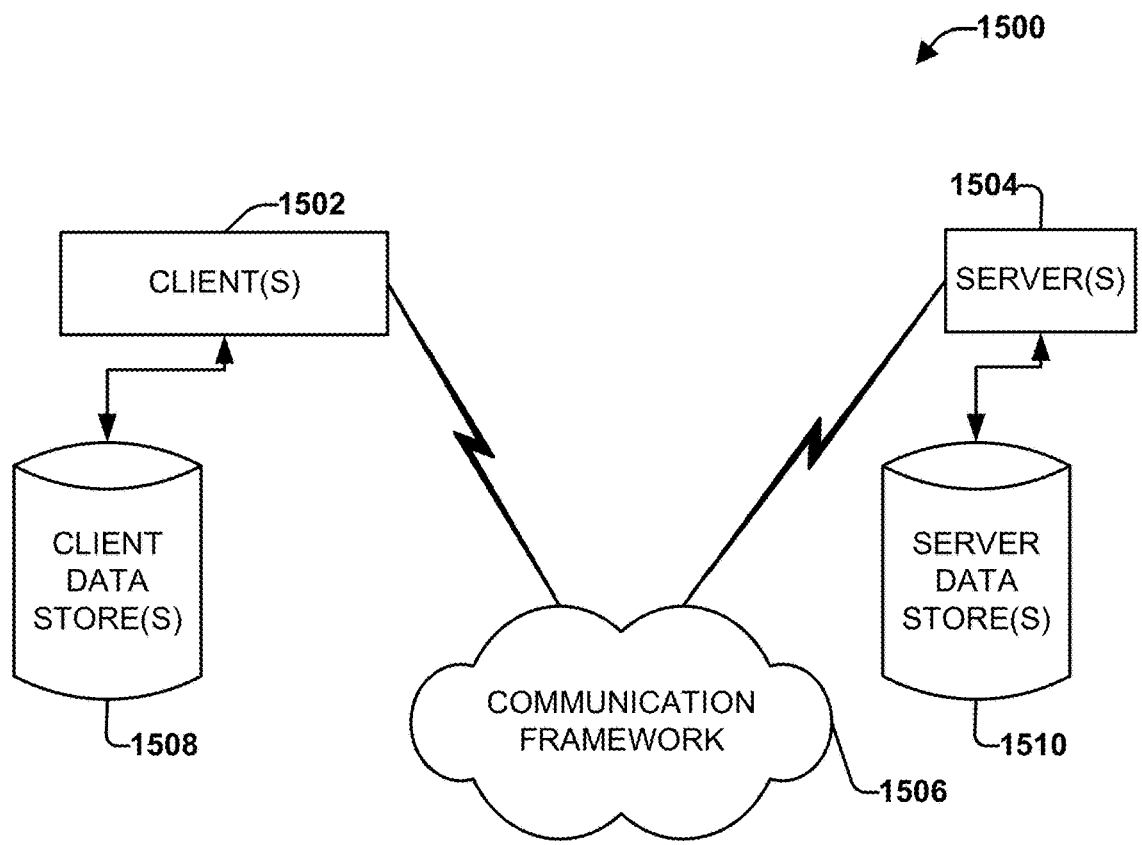
FIG. 15 is a schematic block diagram of a sample-computing environment in accordance with various aspects and embodiments.

Referring now to FIG. 15, there is illustrated a schematic block diagram of a computing environment 1500 in accordance with this disclosure. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a metadata, e.g., associated contextual information, for example. The system 1500 includes a communication framework 1506 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 include or are operatively connected to one or more client data store(s) 1508 that can be employed to store information local to the client(s) 1502 (e.g., associated contextual information). Similarly, the server(s) 1504 are operatively include or are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system for providing targeted advertisements to individuals included in a target audience group at one or more social media systems, comprising:
   a memory that stores computer executable components; and
   a processor that executes the computer executable components stored in the memory, wherein the computer executable components comprise:
      an audience information development component configured to scan and extract target audience information from one or more non-social media data sources based on one or more target audience criteria, the target audience information identifying individuals included in the target audience group;
      a matching component configured to match the individuals with their respective social media profiles at the one or more social media systems based on the target audience information, wherein the target audience information further comprises match feature information identifying a defined set of match features associated with the individuals, and wherein matching the individuals to their respective social media profiles is based on matching the defined set of match features with social media profiles at the one or more social media systems;
      wherein the matching component comprises a match vector component that generates a defined match vector for each of the respective individuals including their identifying information and the defined set of match features and wherein the matching component matches the individuals to their respective social media profiles based on matching parameters of the match vector with parameters of social media profiles at the one or more social media systems; and
      an advertisement campaign component configured to provide the targeted advertisements to the matched individuals via a display of a user device interfacing with the one or more social media systems.

2. The system of claim 1, wherein the audience information development component is configured to extract the target audience information from different non-social media data sources.

3. The system of claim 1, wherein the defined set of match features are selected from the group consisting of: data of birth, age, address, email address, phone number and image data of the individuals' faces.

4. The system of claim 1, wherein the match component comprises an audience clustering component configured to generate two or more clusters of the individuals based on different characteristic of the individuals related to the target audience criteria, and wherein the matching component further separately matches the two or more clusters of individuals to their respective social media profiles.

5. The system of claim 1, further comprising:
   an audience information update component that receives social media information for the individuals from their social media profiles based on the matching and combines the social media information with local target user profile data developed for the respective individuals.

6. The system of claim 5, further comprising:
   a campaign analysis component that employs the local target user profile data to influence delivery of future targeted advertisements to the respective individuals.

7. The system of claim 1, wherein the match vector component selects the set of match features associated with the individuals based on the target audience information.

8. A method comprising:
   extracting, by a system comprising a processor, target audience information from one or more non-social media data sources based on one or more target audience criteria, the target audience information identifying individuals included in the target audience group;
   matching, by the system, the individuals with their respective social media profiles at the one or more social media systems based on the target audience information, wherein the target audience information further comprises match feature information identifying a defined set of match features associated with the individuals, and wherein matching the individuals to their respective social media profiles is based on matching the defined set of match features with social media profiles at the one or more social media systems;
   generating, by the system, a defined match vector for each of the respective individuals including their identifying information and the defined set of match features, and wherein the matching comprises matching the individuals to their respective social media profiles based on the match vector; and
   providing, by the system, the targeted advertisements to the matched individuals via a display of a user device interfacing with the one or more social media systems.

9. The method of claim 8, wherein the extracting comprises extracting the target audience information from different non-social media data sources.

10. The method of claim 8, wherein the defined set of match features are selected from the group consisting of: data of birth, age, address, email address, phone number and image data of the individuals' faces.

11. The method of claim 8, further comprising:
    clustering, by the system, the individuals into two or more clusters of individuals based on different characteristic of the individuals related to the target audience criteria, and wherein the matching comprises separately matching the two or more clusters of individuals to their respective social media profiles.

12. The method of claim 8, further comprising:
    receiving, by the system, social media information for the individuals from their social media profiles based on the matching and combining the social media information with local target user profile data developed for the respective individuals.

13. The method of claim 12, further comprising:
    employing, by the system, the local target user profile data to influence delivery of future targeted advertisements to the respective individuals.

14. The method of claim 8, wherein generating the defined match vector comprises selecting the defined set of match features associated with the individuals based on the target audience information.

15. A non-transitory machine-readable storage medium, comprising executable instructions that, when executed by a processor of a device, facilitate performance of operations, comprising:

extracting target audience information from one or more non-social media data sources based on one or more target audience criteria, the target audience information identifying individuals included in the target audience group;

matching the individuals with their respective social media profiles at the one or more social media systems based on the target audience information, wherein the target audience information further comprises match feature information identifying a defined set of match features associated with the individuals, and wherein matching the individuals to their respective social media profiles is based on matching the defined set of match features with social media profiles at the one or more social media systems;

generating a defined match vector for each of the respective individuals including their identifying information and the defined set of match features, and wherein the matching comprises matching the individuals to their respective social media profiles based on the match vector; and providing the targeted advertisements to the matched individuals via a display of a user device interfacing with the one or more social media systems.

16. The machine-readable storage medium of claim 15, wherein the extracting comprises extracting the target audience information from different non-social media data sources.

17. The machine-readable storage medium of claim 15, wherein the defined set of match features are selected from the group consisting of: data of birth, age, address, email address, phone number and image data of the individuals' faces.

18. The machine-readable storage medium of claim 15, further comprising instructions to facilitate:

clustering the individuals into two or more clusters of individuals based on different characteristic of the individuals related to the target audience criteria, and wherein the matching comprises separately matching the two or more clusters of individuals to their respective social media profiles.

19. The machine-readable storage medium of claim 15, further comprising instructions to facilitate:

receiving, by the system, social media information for the individuals from their social media profiles based on the matching and combining the social media information with local target user profile data developed for the respective individuals.

20. The machine-readable storage medium of claim 15, wherein generating the defined match vector comprises selecting the defined set of match features associated with the individuals based on the target audience information.

* * * * *